US005317645A

United States Patent [19]

Perozek et al.

[11] Patent Number: 5,317,645

[45] Date of Patent: May 31, 1994

[54] METHOD AND APPARATUS FOR THE RECOGNITION AND COUNTING OF DISCRETE OBJECTS

[75] Inventors: Barbara Perozek, New Canaan; Timothy R. Smith, Stamford, both of Conn.

[73] Assignee: Kirby Lester Inc., Stamford, Conn.

[21] Appl. No.: 662,418

[22] Filed: Feb. 28, 1991

[51] Int. Cl.[5] ........................ G06K 9/00; G06M 7/00

[52] U.S. Cl. ........................................ 382/8; 382/1; 382/25; 377/10; 377/11; 209/522; 364/555

[58] Field of Search .................. 382/1, 8, 25; 377/10, 377/11; 209/522; 364/555; 358/101

[56] References Cited

U.S. PATENT DOCUMENTS

| | | | |
|---|---|---|---|
| 3,063,632 | 11/1962 | Stringer | 235/98 |
| 3,290,488 | 12/1966 | Sewell | 235/92 |
| 3,678,254 | 7/1972 | Graff | 235/92 |
| 3,692,980 | 9/1972 | Getker et al. | 235/92 |
| 3,717,751 | 2/1973 | Fluck | 235/92 |
| 3,789,194 | 1/1974 | Kirby | 235/92 |
| 3,900,718 | 8/1975 | Seward | 235/150.51 |
| 4,127,766 | 11/1978 | Thayer | 235/92 |
| 4,396,828 | 8/1983 | Dino et al. | 377/6 |
| 4,555,624 | 11/1985 | Steffen | 250/223 |
| 4,635,215 | 1/1987 | Friend | 364/555 |
| 4,743,760 | 5/1988 | Giles | 364/555 |
| 4,782,500 | 11/1988 | Lyngsie | 377/6 |
| 4,962,538 | 10/1990 | Eppler et al. | 382/1 |
| 5,016,281 | 5/1991 | Eppler et al. | 382/1 |
| 5,113,451 | 5/1992 | Chapman et al. | 377/10 |

*Primary Examiner*—Leo H. Boudreau

*Assistant Examiner*—Chris Kelley

*Attorney, Agent, or Firm*—Kenyon & Kenyon

[57] ABSTRACT

An apparatus for counting discrete objects of various sizes and shapes as they travel through the apparatus in a disorderly flow. The apparatus includes a sensor array which comprises a plurality of photodetectors arranged in a linear fashion. The discrete objects are passed over the sensor array. By utilizing the sensor array as a means for obtaining information about the discrete objects, the apparatus samples the sensor array at predetermined time intervals, examines the various contours of the images produced through the sampling and based upon predetermined criteria determines whether an image represents one or more objects.

30 Claims, 21 Drawing Sheets

| LINE | PREA | TOTA | ESENTA | ESFLAG | DOUBLES? | UPDATED TOTA |
|---|---|---|---|---|---|---|
| 1 | 0 | 1 | 0 | 0 | NO | — |
| 2 | 1 | 3 | 0 | 0 | NO | — |
| 3 | 3 | 4 | 3 | 1 | NO | — |
| 4 | 4 | 6 | 3 | 1 | YES | 3 |
| 5 | 3 | 4 | 3 | 1 | NO | — |
| 6 | | | | | | |
| 7 | | | | | | |
| 8 | | | | | | |

| | 1 | 2 | 3 | 4 | 5 | 6 | DLE | LDIMPIN | LDIMPOUT | LDIMPSIZ | DWIDTH | WIDIN | WIDOUT | WIDTH | COUNT |
|---|---|---|---|---|---|---|---|---|---|---|---|---|---|---|---|
| 1 | | | | | | | – | – | – | – | – | – | – | – | 0 |
| 2 | | | | | | | – | 0 | 0 | 0 | – | 0 | 0 | 0 | 1 |
| 3 | | | | | | | 0 | 0 | 0 | 0 | 0 | 0 | 0 | 0 | 1 |
| 4 | | | | | | | 1 | 0 | 0 | 0 | 1 | 0 | 0 | 0 | 1 |
| 5 | | | | | | | −1 | 1 | 0 | 0 | −1 | 1 | 0 | 0 | 1 |
| 6 | | | | | | | 1 | 1 | 1 | 2 | 1 | 1 | 1 | 2 | 1 |
| 7 | | | | | | | 0 | 1 | 1 | 2 | −1 | 1 | 0 | 0 | 1 |
| 8 | | | | | | | 1 | 1 | 2 | 3 | 1 | 1 | 1 | 2 | 1 |
| 9 | | | | | | | 0 | 1 | 2 | 3 | 0 | 1 | 1 | 2 | 1 |
| 10 | | | | | | | 0 | 1 | 2 | 3 | 0 | 1 | 1 | 2 | 1 |
| 11 | | | | | | | 0 | 1 | 2 | 3 | 0 | 1 | 1 | 2 | 1 |

FIG. 19A

| | 1 | 2 | 3 | 4 | 5 | 6 | DLE | LDIMPIN | LDIMPOUT | LDIMPSIZ | DWIDTH | WIDIN | WIDOUT | WIDTH | COUNT |
|---|---|---|---|---|---|---|---|---|---|---|---|---|---|---|---|
| 1 | | | | | | | – | – | – | – | – | – | – | – | 0 |
| 2 | | | | | | | – | 0 | 0 | 0 | – | 0 | 0 | 0 | 1 |
| 3 | | | | | | | −1 | 1 | 0 | 0 | −2 | 2 | 0 | 0 | 1 |
| 4 | | | | | | | 0 | 1 | 0 | 0 | 0 | 2 | 0 | 0 | 1 |
| 5 | | | | | | | 0 | 1 | 0 | 0 | −1 | 3 | 0 | 0 | 1 |
| 6 | | | | | | | −1 | 2 | 0 | 0 | −1 | 4 | 0 | 0 | 1 |
| 7 | | | | | | | 1 | 2 | 1 | 3 | 1 | 4 | 1 | 5 | 2 |
| 8 | | | | | | | 0 | 0 | 0 | 0 | 1 | 0 | 0 | 0 | 2 |
| 9 | | | | | | | 0 | 0 | 0 | 0 | 1 | 0 | 0 | 0 | 2 |
| 10 | | | | | | | 0 | 0 | 0 | 0 | 1 | 0 | 0 | 0 | 2 |
| 11 | | | | | | | 0 | 0 | 0 | 0 | 1 | 0 | 0 | 0 | 2 |

FIG. 19B

METHOD AND APPARATUS FOR THE RECOGNITION AND COUNTING OF DISCRETE OBJECTS

FIELD OF THE INVENTION

The invention relates to a method and apparatus for counting discrete objects, and, more particularly, to a computerized method and apparatus for counting discrete objects.

BACKGROUND OF THE INVENTION

Optical counters have been utilized in various applications to count objects. Typically, these counters include a feed system to reduce the collection of objects to a single-file orderly line, an optical sensor apparatus and a counting system. Various mechanical systems for producing a single-file flow include rotational and linear vibrators, rotating discs, air jets, gravity feeds, moving belts, etc. In such optical counters, the counting apparatus that performs the actual count of a single-file flow is simple in concept. A light source is placed opposite a single optical sensor and the object stream is directed between the sensor and the light source. The shadows created by the objects yield alternating light and dark patterns on the sensor. The sensor produces an electrical signal representative of these patterns and transmits the electrical signal to an electrical counting apparatus.

Accurate counts are possible provided the flow of objects is in a discrete series of single objects. Any failure of the mechanical feed system that results in flow that is not discrete will cause an inaccurate count. Inaccurate counts are due to the operation of the sensor which changes state in response to the presence or absence of light without respect to whether a light blockage is caused by one or more objects. Thus, if two or more objects cross the sensor simultaneously or if two or more objects are in physical contact, the count will be erroneous because a one to one correspondence between discrete objects and sensor state changes did not exist. This condition in the object flow stream is referred to as "bunching".

In this type of counter, stringent demands are placed on the feed system because of the unforgiving nature of the sensors. These systems are typically complex and require parts changes and adjustments for each different size and shape object being counted. Thus, the set up requires a skilled operator. An object counter of this kind achieves accurate count at the sacrifice of size, complexity and cost.

Heretofore known electronic systems are not highly accurate, particularly when small objects such as pharmaceutical capsules, tablets, etc. are to be counted. Such systems have lacked the sophisticated sensing and counting electronics and "intelligent" software to drive the electronics.

The foregoing problems of prior art optical counters manifest the need for improvement. Specifically, there is a need for an optical counting system which reduces the requirement for a high performance feed system and is capable of identifying and counting objects which are bunched together with a high degree of accuracy. Such a counting system would be able to "intelligently" observe the object stream to recognize and account for deviations from the ideal discrete object flow.

SUMMARY OF THE INVENTION

Accordingly, the present invention provides a method and apparatus for counting discrete objects of various sizes and shapes as they travel through the apparatus. The present invention includes a sensor array which comprises a plurality of photodetectors arranged in a linear array. Discrete objects are passed over the sensor array. The apparatus samples the sensor array at predetermined time intervals, examines the various contours of the images produced through the sampling and based upon predetermined criteria determines whether an image represents one or more objects.

The objects which the present invention are able to count accurately are opaque, contain no holes and are everywhere convex, e.g., pharmaceutical capsules, tablets, etc. Also, the present invention is capable of counting objects of various sizes and shapes provided that the objects are of the same size and shape for a given count operation.

Generally, the present invention comprises a general purpose counting apparatus which includes mechanical features to cause a flow of the objects past the sensor array and electronic components to perform the counting.

In accordance with one feature of the invention, the electronic components include a programmed microprocessor system which is adapted to sample the sensor array and to count objects by examining various contours of the images produced through image processing as they traverse the linear sensor array. The programmed microprocessor system includes a hierarchy of software processing modules that serve to identify discrete objects that are passed across the sensor array. By sampling the sensor array at predetermined time intervals, the programmed microprocessor system obtains data representative of "blocked" or "unblocked" conditions at each sensor location in the sensor array. The software processing modules are directed to recognizing specific "bunching" conditions, i.e., where two or more objects are in juxtaposition. These modules are organized into one coherent program and arranged in a preselected hierarchy to enhance the ability of the counting apparatus to efficiently count objects of random size and shape while avoiding redundant counts.

The programmed microprocessor system continuously samples the state of the sensor array at the predetermined time intervals to obtain data representative of an image of an object or objects passing across the sensor array. The programmed microprocessor system examines this data by executing the processing modules in a predetermined, controlled order. Each module will check the various contours of the surface of the image being processed. Image processing of such information by the programmed microprocessor system ascertains whether the image is representative of one or more objects, thus enabling the apparatus to accurately count discrete objects.

BRIEF DESCRIPTION OF THE DRAWINGS

FIG. 19A shows a graphical representation of an image sampled by the sensor array and processed by the programmed microprocessor system that illustrates an example of a "noise dimple" in a single object.

FIG. 19B shows a graphical representation of an image sampled by the sensor array and processed by the programmed microprocessor system that illustrates a dimple in a single object having similar characteristics to the left dimple in FIG. 19A.

DETAILED DESCRIPTION

Figure 1:
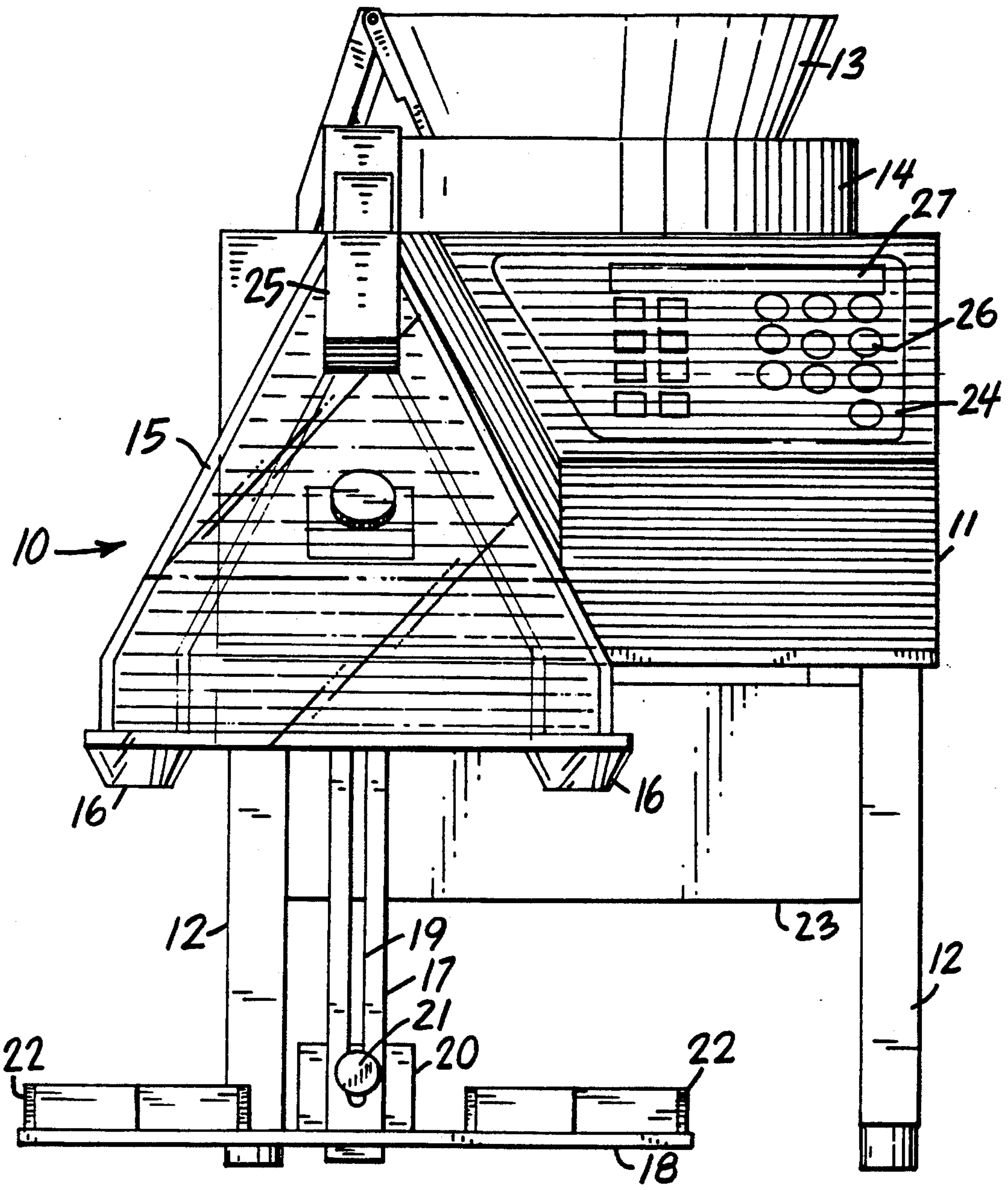
FIG. 1 is a front view of an object counter according to the present invention.
Figure 2:
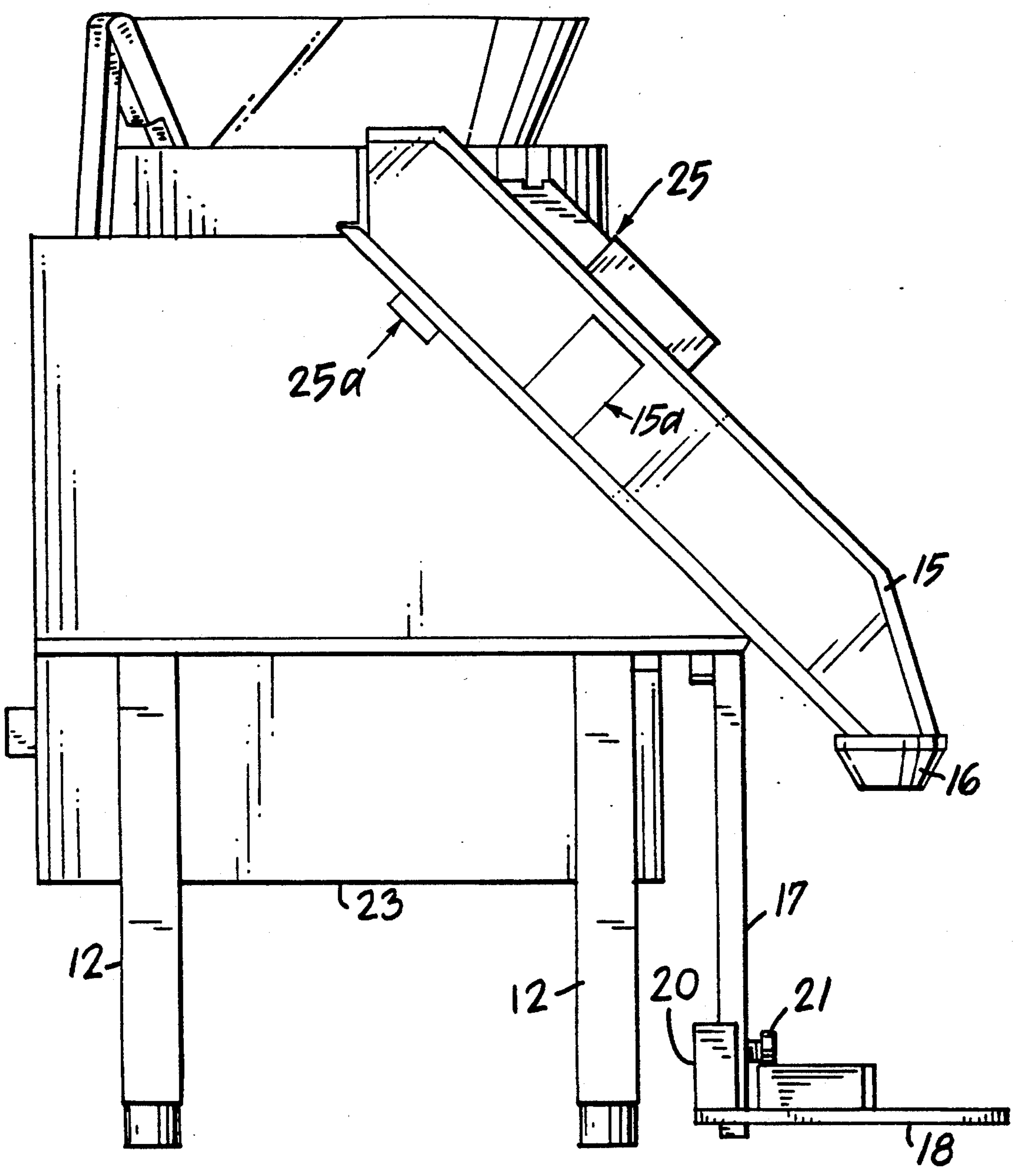
FIG. 2 is a side view of the object counter of FIG. 1.

Referring now to FIG. 1, there is illustrated an object counter generally indicated by the reference numeral 10. The object counter 10 includes a housing 11 that is supported by leg elements 12. An object supply hopper 13 contains a plurality of objects to be counted and dispensed to bottles, containers or other types of packaging (not specifically illustrated). The hopper 13 is received into a feed bowl 14 The feed bowl 14 is subjected to a vibrating motion, as will be explained, to cause objects from the hopper 13 to move from the hopper 13 and into the feed bowl 14. An exit ramp 15 is mounted to the front of the housing 11. The feed bowl 14 is coupled to an upper end of the exit ramp 15 such that the vibrating motion of the feed bowl 14 also causes a controlled movement of objects from the feed bowl 14 and into the exit ramp 15.

As illustrated in FIG. 1, the exit ramp 15 is downwardly disposed at an angle relative to the housing 11. Accordingly, gravity will cause objects that enter the upper end thereof from the feed bowl 14 to continue moving toward the lower end of the exit ramp 15. The exit ramp 15 is arranged to have a progressively expanding width in the downstream direction and includes internal wall elements (not specifically illustrated) to form two object paths through the ramp 15, one on each side of the ramp 15. A diverter gate located at 15*a* is mounted to the exit ramp 15 to either divert the moving objects to one side path or the other of the exit ramp 15 as they move toward the downstream lower end of the exit ramp 15, as is known in the art. An exit opening 16 is provided at each side of the lower end of the exit ramp 15 for egress of the objects from the internal paths to fill containers, as will appear.

A downwardly extending support element 17 is mounted to the housing 11 to support a container platform 18 at a position aligned below the exit openings 16 of the exit ramp 15. The element 17 is formed to include a slot 19 extending along the longitudinal axis thereof. A mounting block 20 of the container platform 18 is secured to the support element 17 via a friction fit between a screw 21 threadidly received into the mounting block and the slot 19, as illustrated. In this manner, the vertical position of the container platform, 18 can be selectively adjusted relative to the exit openings 16 of the exit ramp 15. Thus, containers, bottles or other types of packaging of various sizes can be positioned at an optimal spacing from the exit openings 16 by adjusting the position of the screw 21 within the slot 19.

The container platform 18 is provided with a pair of container holders 22 such that two containers can be conveniently positioned, one below each of the exit openings 16. The object counter 10 is operated to cause continuous movement of objects from the hopper 13 to a first one of the exit openings 16 of the exit ramp 15 until the number of objects dispensed to a first container positioned below that exit opening 16 reaches a preselected amount. The diverter gate at 15*a* can then be controlled to cause the objects to egress from the other exit opening 16 to fill a second container while a new empty container is placed beneath the first exit opening 16 and so on.

An electronics box 23 is supported by the housing 11 to house an electronic object counter according to the present invention, as will be described in detail below. The electronic object counter is coupled to the diverter gate 15*a* and to each of a display and control panel 24 and an infrared scanner device 25, 25*a* (see FIG. 6). The panel 24 is mounted to a front surface of the housing and includes a keyboard 26 for selecting the number of objects to be dispensed to containers, the number of containers to be filled and other appropriate control keys, as will be explained below. The panel 24 is also provided with a display screen 27 to display a current object count during the operation of the counter 10.

The infrared scanner device 25, 25*a* is positioned to form a sensing plane across the upper end of the exit ramp 15 so that objects or clusters of objects moving into the ramp 15 are detected for image processing according to the present invention to determine an object count. The electronic object counter housed in the electronics box 23 permits object movement to the first exit opening 16 until it determines that the preselected number of objects have entered the exit ramp 15. Once the electronic object counter determines that the preselected number of objects has entered the exit ramp, it will control the diverter device 15*a* to divert subsequent objects to the other exit opening 16 to fill a second container.

Figure 3:
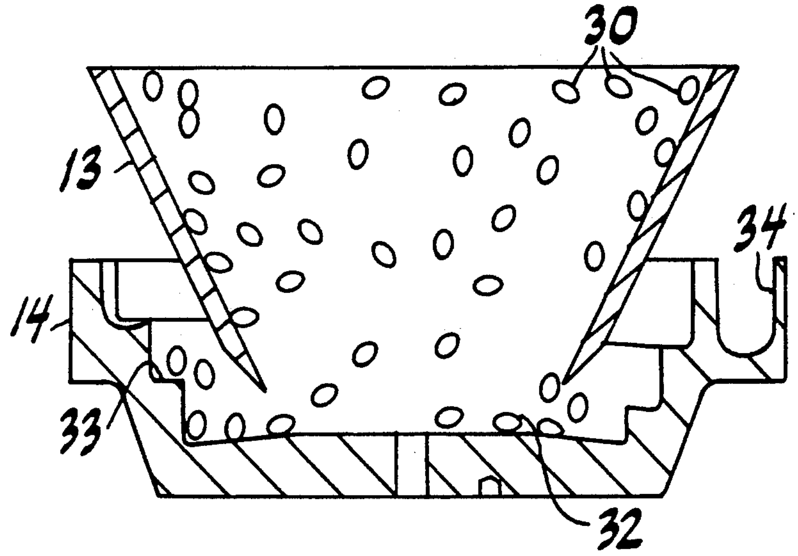
FIG. 3 illustrates a side cross sectional view of the feed bowl utilized in the exemplary embodiment of the present invention.

Referring now to FIG. 3, there is illustrated in cross section, the hopper 13 and the feed bowl 14 utilized in the exemplary embodiment of the present invention. The hopper 13 receives and holds the objects 30 to be counted. The purpose of the feed bowl 14 is to take a bulk aggregate of discrete objects 30 from the hopper 13 and produce a relatively orderly, more or less, single file flow. The accurate counting of the objects as they travel more or less in single file into the ramp 15 is achieved by the electronic object counter in the electronics box 23 as is discussed below.

Figure 4:
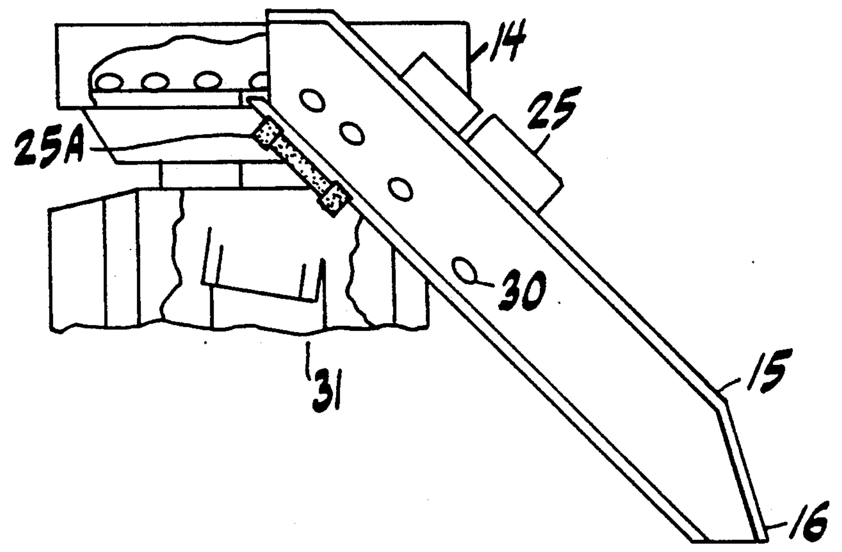
FIG. 4 illustrates a cross sectional view showing the flow path of the objects from the feed bowl to a ramp exit.

The feed bowl 14 is coupled to and driven by a driver assembly 31 mounted within the housing 11 as illustrated in FIG. 4. The feed bowl 14 is driven in such a way as to produce a combination of rotary and vertical motion as is known in the art. The two occur simultaneously at the same frequency, e.g., 120 Hz. The feed bowl 14 is controlled by the feed bowl driver 31 which together form a mechanically resonant inertial system.

Referring back to FIG. 3, based upon the vibration of the feed bowl 14, the objects 30 are throttled through a relatively narrow gap 32 between the bottom of the hopper 13 and the bottom of the feed bowl 14. The throttling is achieved by narrowing the flow path. The objects 30 that leave the hopper 13 build up a small reservoir in the bottom of the feed bowl 14 that serve to block the flow of more objects 30 out of the hopper 13.

The objects continue to move along a groove 33 formed within the feed bowl 14 which strips a small quantity of objects 30 off from the outside of the reservoir in the bottom of the feed bowl 14 and leads them up towards the top of the feed bowl 14. The groove 33 is pitched toward the outside of the feed bowl 14 to keep objects 30 from dropping back into the center of the feed bowl 14. This pitch has the additional effect of forcing the objects 30 one behind the other as the vibrations jostle the objects 30 up the groove 33.

The feed bowl 14 includes a trough 34 which is also utilized to reduce the disorderly flow of the objects 30 to an orderly flow. The transition from the groove 33 to the trough 34 is a small step portion (not specifically illustrated) that serves to tumble any objects 30 that may be riding on top of each other. The objects 30 tend to accelerate upon entering the trough 34. This produces additional space between objects 30 which allows any rogue objects 30 to fall into place.

FIG. 4 illustrates a cross sectional view showing the flow path of the objects 30 from the feed bowl 14 to one of the exit openings 16. As illustrated, once the objects exit the feed bowl 14 and begin travelling down the ramp 15, they cross the sensing plane defined by the infrared scanning device 25, 25*a*. After the objects 30 cross the sensing plane, they continue down the ramp through the exit opening 16 into a preselected container as described above.

Figure 5:
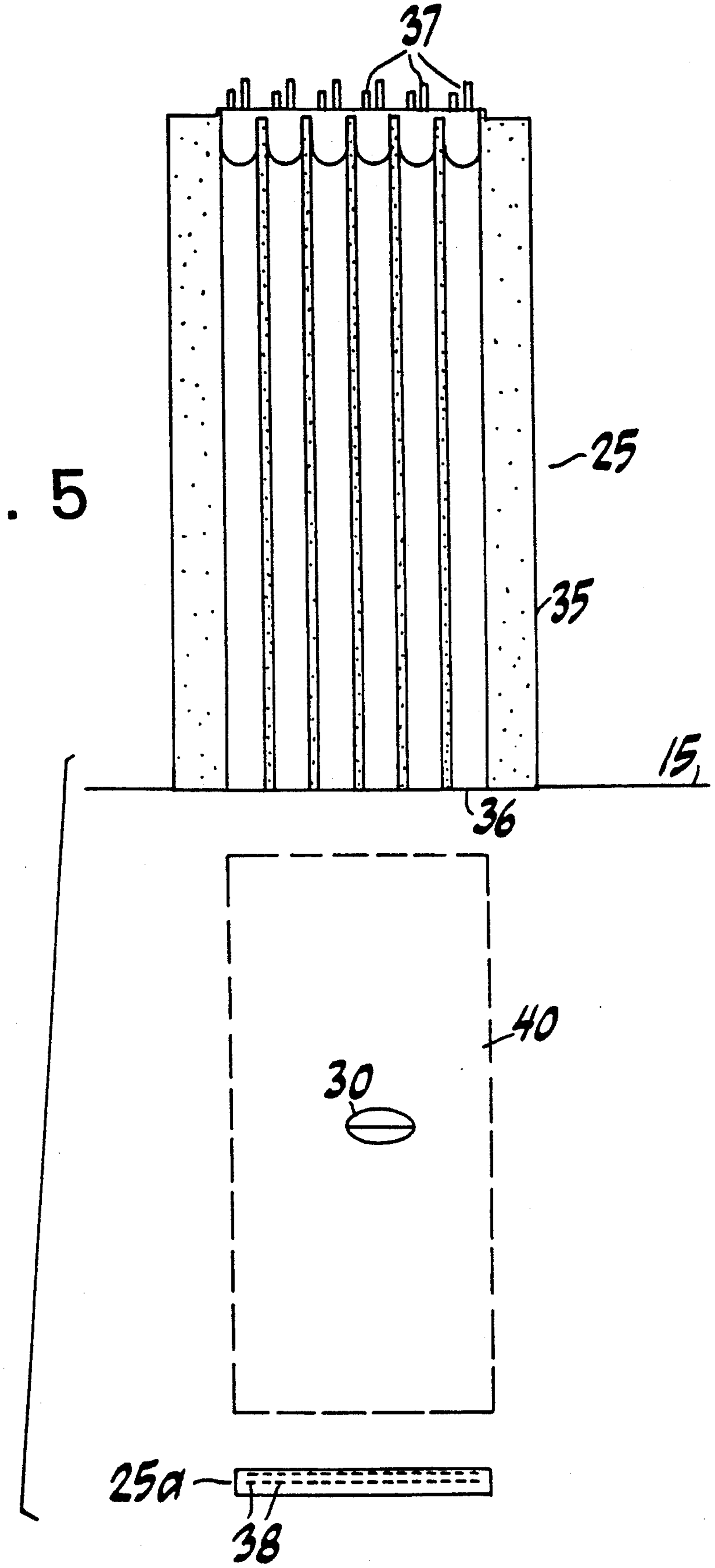
FIG. 5 illustrates a cross sectional view of a collimator and a detector used in the exemplary embodiment of the present invention.

Referring now to FIG. 5, there is illustrated a cross sectional view of the infrared scanning device 25, 25*a*, as mounted on the exit ramp 15. The device 25 comprises a collimator 35 which is a plastic member having six holes 36 drilled therethrough. One light emitting diode 37, which can comprise an infrared ("IR") emitter, is fit into each one of the six holes 36 at the top of the collimator 35. The device 25*a* comprises a linear array of IR detectors 38, referred to as "cells". The resultant light rays from the collimator 35 are approximately parallel to the holes 36 but diverge slightly so that all of the cells 38 are illuminated if the space between is unobstructed.

The region in FIG. 5 indicated by the dotted lines 40 encloses the traveling objects. It represents the cross section of two channel walls at the right and left and two windows at the top and bottom. Illustrated therein is an object 30 which passes directly over the detectors 38. The light emitted by the diodes 37 is partially blocked by the object 30 such that four or five of the cells 38 detect an absence of IR light. A graphical representation of a scan carried out at this time would include a series of seven clear cells at the left followed by four or five blocked cells, and then the remaining clear ones. The uncertainty as to whether four or five cells are blocked is attributable to a noise level of one cell. This is inherent in the imaging process and is taken into account by the processing modules.

Figure 6:
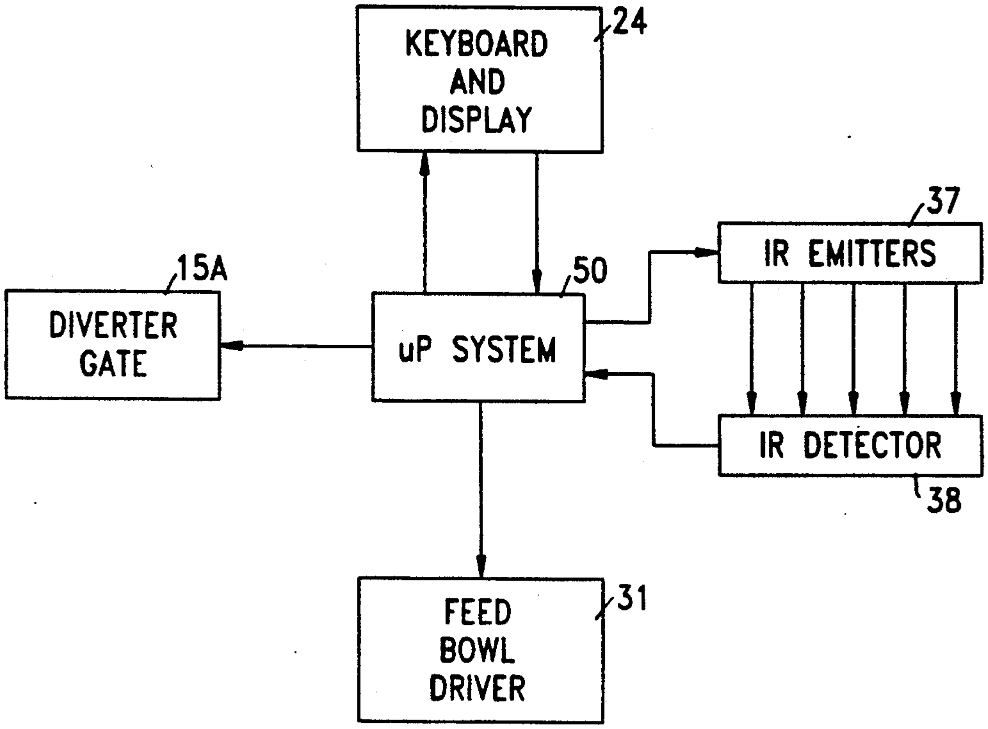
FIG. 6 is a block diagram of an electronic counter system according to the present invention.

Referring now to FIG. 6, there is illustrated in block diagram form an exemplary embodiment of the electronics counter for practicing the present invention. The counter comprises a programmed microprocessor system 50, the keyboard and display 24, the diverter gate 15*a*, the feed bowl driver 31, the IR emitters 37 and the respective axially aligned IR detectors 38. The programmed microprocessor system 50 is electronically coupled to the keyboard and display 24, the diverter gate 15*a*, the feed bowl driver 31, the IR emitters 37 and the IR detectors 38. The space between the axes of the IR emitters 37 and IR detectors 38 comprises the sensing plane.

An operator enters the number of containers which are to be filled and the desired number of objects to be stored in each container into the microprocessor system 50 via the keyboard 26. The keyboard 26 can also include control keys to start, cancel, clear and repeat operation by the programmed microprocessor system 50. When the start key is activated, the programmed microprocessor system 50 activates the feed bowl driver 31 which causes the objects 30 to be fed in a more or less single file manner across the sensing plane.

The state of the sensing plane is sampled at predetermined time intervals by the programmed microprocessor system 50. As objects 30 cross this plane, the IR light emitted from the IR emitters 37 will be blocked by objects 30 as they pass through the sensing plane as discussed above. This will cause some of the IR detectors 38 to detect the absence of IR light. This condition is transmitted to the programmed microprocessor system 50 as an electrical signal. The programmed microprocessor system 50 interprets the electrical signal to determine which IR detectors 38 are blocked. Based upon this information, a count is determined by the programmed microprocessor system 50.

The count is instantaneously displayed on the display 27. When the desired count is reached, the diverter gate 15*a* is actuated by the programmed microprocessor system 50 to direct the flow of objects to a new container. This cycle then repeats until the preselected number of containers are full.

The present invention provides for the programmed microprocessor system 50 to count discrete objects as they traverse the linear sensor array 25*a*. The programmed microprocessor system 50 includes a hierarchy of processing modules that serve to identify discrete objects that are passed across the sensor array 25*a*. Throughout this specification, various variables, flags and special terms are introduced. The definitions of these are set forth in a Glossary of Terms appended hereto.

Each one of the processing modules (with one exception) is individually tailored to detect specific geometric features of an image of the objects to determine the presence of more than one object, i.e. a "doubles" condition. Each module is called from the main program hierarchy. When the module has completed its processing, it passes control back to the main program.

Figure 7A:
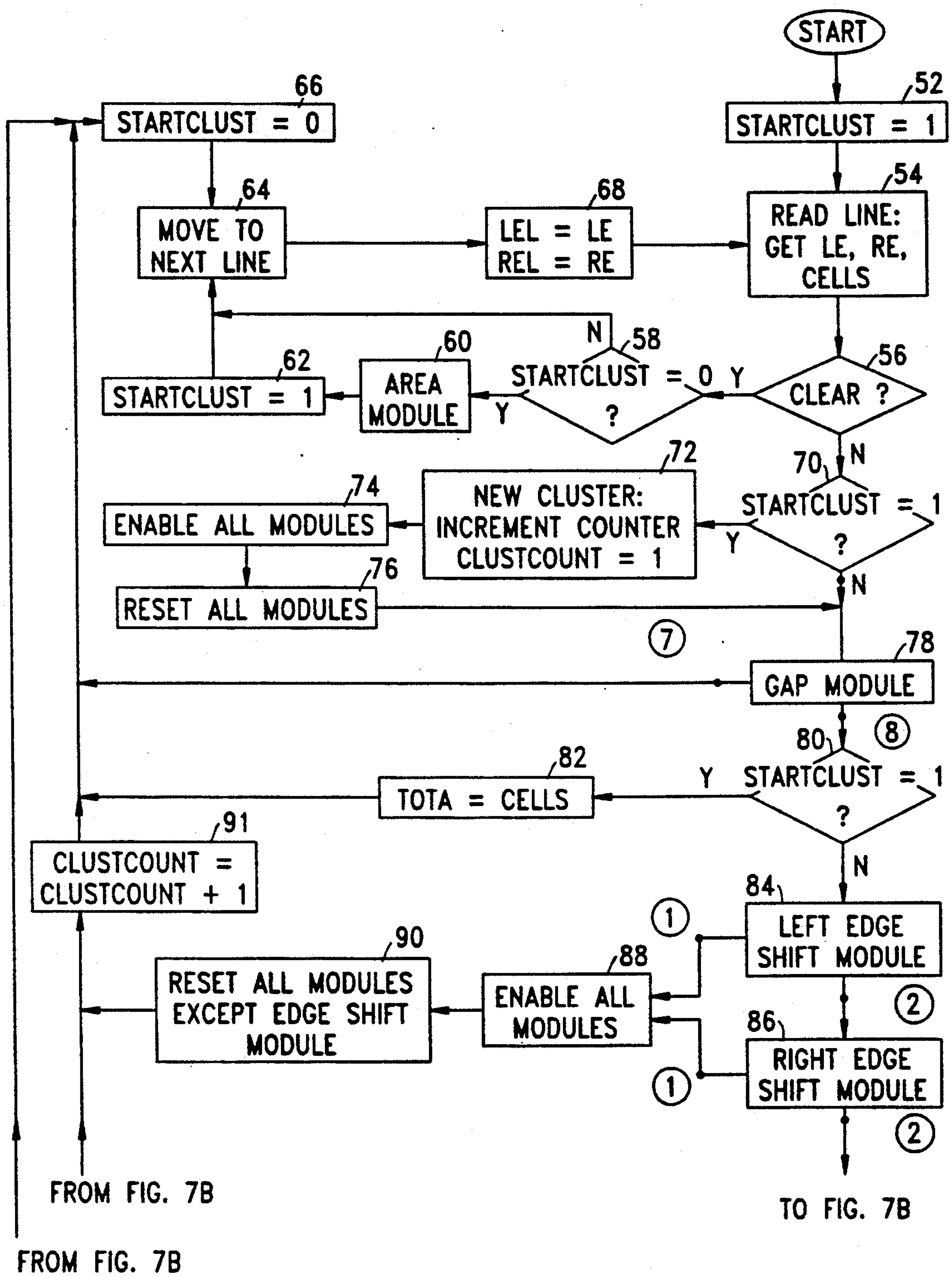
FIGS. 7A-7B illustrate a flow chart for implementing the main program according to the present invention.
Figure 7B:
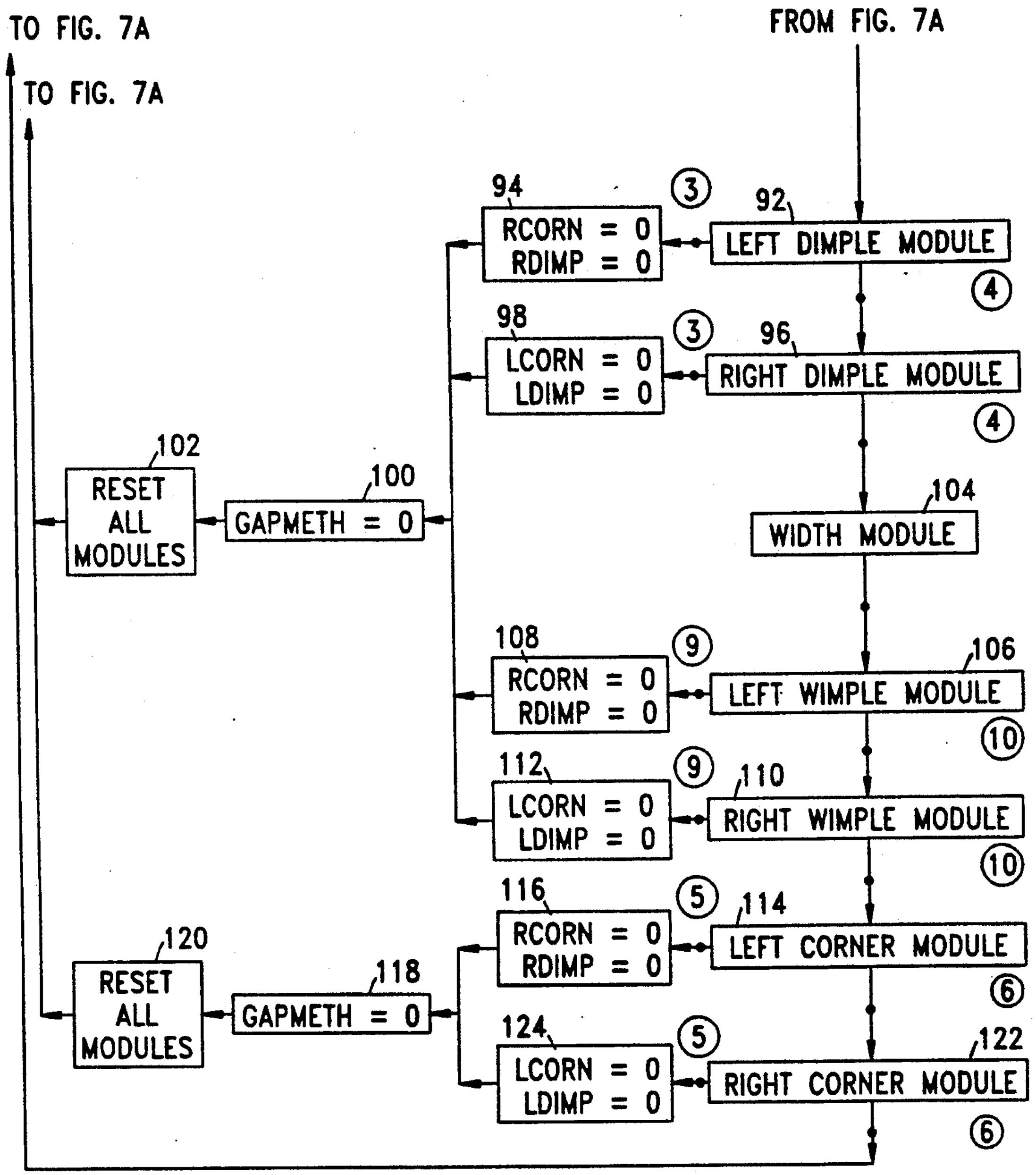

Referring now to FIGS. 7A-7B, there is illustrated in flow chart form the organization of the processing modules which perform the fundamental processing to detect discrete objects and maintain a count of those objects. These processing modules are arranged in a hierarchical order to optimize the performance of the apparatus. This hierarchical order is accomplished by embedding the processing modules in a "main program" which performs front-end processing and calls the various processing modules pursuant to the module hierarchy.

The front-end processing performed by the main program examines the sampled data generated by the sensor array to detect certain conditions. To facilitate this discussion of the front-end processing, reference is made to FIG. 8 which illustrates a graphic representation of an image processed by the programmed microprocessor system 50. The horizontal blocks indicate the state of the individual cells of the sensor array at a particular time interval. As shown, there are sixteen cells employed in the sensor array of the exemplary embodiment of the present invention. Each horizontal group of sixteen represents one complete scan of the sixteen cells at one of the time intervals. Hereinafter, each scan is referred to as a "line". The vertical array of lines reflect several samples of the sensor array over a sequence of time intervals to provide an image representative of an object or objects traversing the sensing plane. Each darkened box indicates that a corresponding cell is blocked, i.e., an object has blocked the infrared light. Each clear box indicates that a corresponding cell is not blocked, i.e., an object is not blocking the infrared light transmitted by a corresponding diode toward that specific cell.

The main program first examines data from the sensor array to find the first line of a "cluster". A cluster is an image of one or more objects which are bunched together as, e.g., the image illustrated in FIG. 9C. After the first line of a cluster is detected, the main program "resets" various variables and flags associated with the processing modules. Also, all modules are "enabled" at this time. Both of these operations are discussed below.

There are seven processing modules which comprise the main program. These modules are set forth below in the order they occur in the program hierarchy:

1) Gap detection;
2) Left and Right Edge Shift detection;
3) Left and Right Dimple detection;
4) Width module;
5) Left and Right Wimple detection;
6) Left and Right Corner detection; and
7) Area module.

The individual modules are more fully described below. These software modules may or may not be executed depending upon the parameters of the main program.

After scanning each line, the main program executes each of the modules in a predetermined sequential fashion pursuant to the hierarchy set forth above. The Area module is the exception to the foregoing sequence since it can only be executed at the completion of each cluster. When a doubles condition is identified by a module, the remainder of the modules in the sequence are not executed at that line. In fact, some of the modules are disabled so that they are not executed in the lines to follow. These provisions are necessary to ensure that a doubles condition is only counted once; it is possible for a cluster of two objects to contain as many as three different geometric features that are each recognized as a doubles condition by the various modules. Without disabling the modules as described above, the objects would be counted redundantly.

The processing modules are arranged in the foregoing hierarchy to provide the most efficient scheme for counting the greatest number of objects in a cluster. As set forth above, some modules may be disabled by another module when it detects a doubles condition. When these modules are disabled, it is possible that some objects may pass the sensor array undetected. Therefore, the hierarchy of the processing modules is designed to limit the number of modules that are disabled while ensuring that a doubles condition is counted only once.

The hierarchy of the processing modules is generally selected so that the module that disables fewer modules precedes the others. This allows the processing modules to more readily identify a third object within a cluster. For example, when doubles are identified by the Edge Shift module, no modules are disabled whereas when doubles are detected by the Left Dimple module, four modules are disabled. Thus, the Edge Shift module is positioned in the hierarchy before the Left Dimple module. Since the Dimple, Wimple and Corner modules disable the same number of processing modules, the ordering of these modules is arbitrary.

The first line of a cluster is found by advancing past clear lines, i.e., ones with no blocked cells, until a line with blocked cells is found. Once the first line of a cluster is found, the counter is incremented by one to indicate the detection of at least one object. At the same time, the processing modules are enabled by setting a number of flags which are utilized by the various modules.

In addition to incrementing the counter and enabling the modules, the modules are "reset" each time a new cluster is recognized. The Edge Shift module is also reset when certain conditions involving gapped lines occur. These conditions are discussed below. To "reset" the processing modules means to erase any information stored in their variables about the geometry of the previous cluster. Resetting occurs for all modules except the Area module when a cluster is started.

At each line, the processing modules check for a situation that would indicate the presence of an object within the cluster that has not yet been counted. A "doubles" condition is detected when the object identification occurs after the first line of a cluster where there was an initial count of one. Two such "doubles"

conditions within one cluster would then indicate three objects there. Likewise, four or more objects may be counted in a single cluster. Once a doubles condition is detected by any module, the remaining modules are bypassed and control passes back to the beginning of the main program to obtain a next line from the sensor array.

A principle behind the operation of the processing modules is that it is physically impossible to have an "internal corner" in an image if "normal" objects are being counted. "Normal" means that the objects being counted are everywhere convex, e.g., they are not in any way saddle or "bow-tie" shaped. An internal corner is a right angle formed in the perimeter of an image comprising at least two vertical and two horizontal blocked cells that makes the contour of the object appear concave.

The Gap module is designed to detect "gap" conditions. A "gap" is defined as the condition in a line where there is at least one clear cell between two blocked cells. Conditions for doubles are detected by the Gap module when there is a gap at any line positioned after the first and before the last line of the cluster. To prevent redundant counting, the Gap module is disabled from identifying additional entities once it has already identified a condition for doubles within a cluster. This is because a pair of objects will frequently be represented by an image that contains more than one gapped line.

Figure 8:
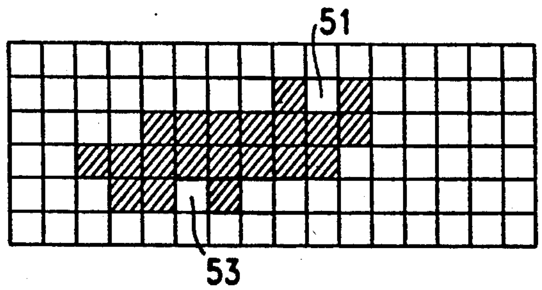
FIG. 8 shows a graphical representation of an image sampled by the sensor array and processed by the programmed microprocessor system.

FIG. 8 illustrates a scanned object that shows two gaps due to a noise level of one cell which is inherent in the imaging process. The two "noise gaps" are designated in FIG. 8 by reference numerals 51 and 53.

The Gap module differentiates the gaps that indicate doubles from those that are due to noise. The module accomplishes this by assuming that all of the gaps due to noise are positioned on the first or last scan of the cluster. A gap which is not due to noise but lies on the first or last line will most always be accompanied by another gap on the adjacent line. By confirming that this second gap exists, conditions for doubles are detected.

Figure 9A:
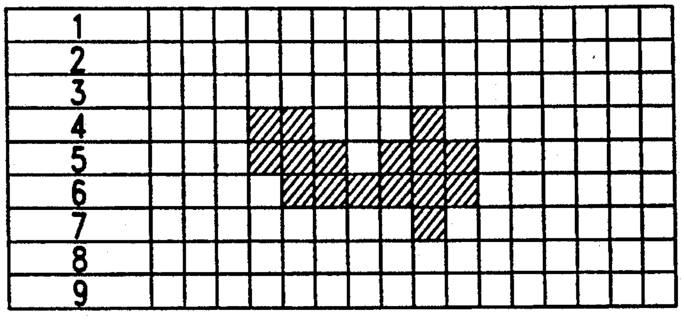
FIGS. 9A-9C show graphical representations of images sampled by the sensor array; the images including gap conditions indicative of doubles.
Figure 9B:
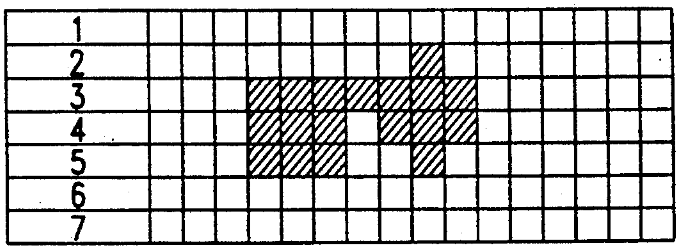
Figure 9C:
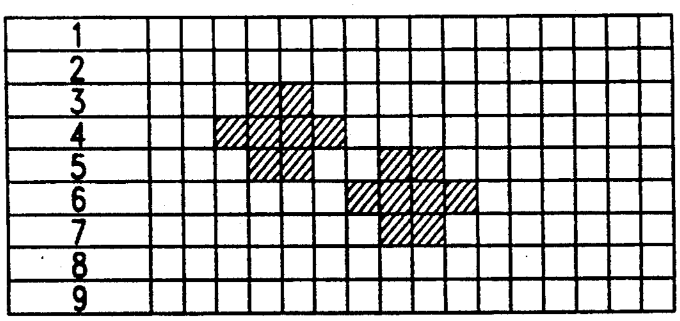
Figure 10A:
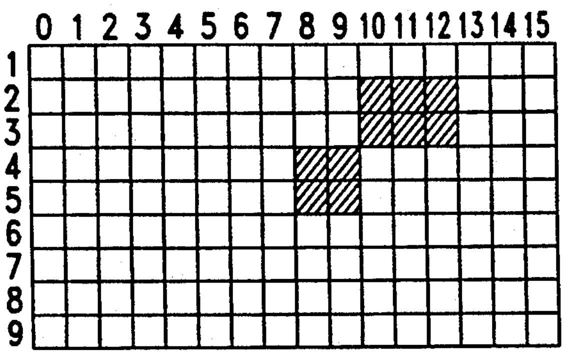
FIGS. 10A-10C show graphical representations of images sampled by the sensor array; the images including edge shift characteristics.
Figure 10B:
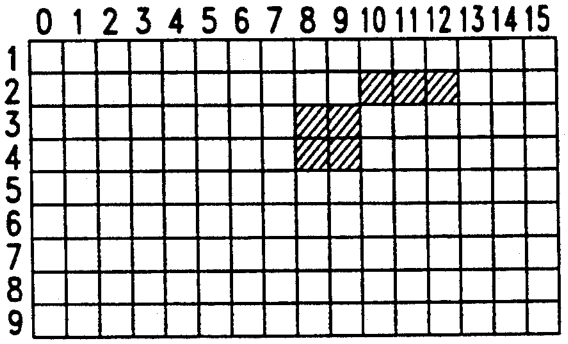
Figure 10C:
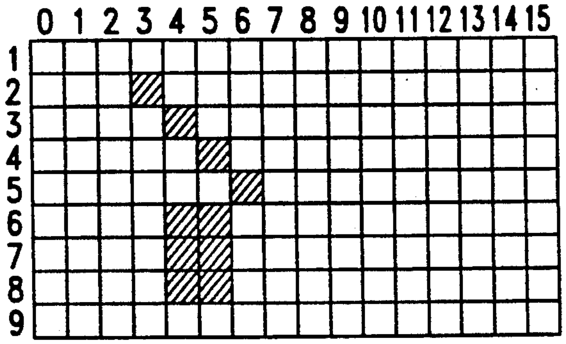

Thus, conditions for doubles exist when two consecutive gaps are detected with one of them either on the first or last line of the cluster, or when one gap is detected between the first and last lines. These three double scenarios are illustrated in FIGS. 9A-9C and are discussed below. The Edge Shift module detects "regular edge shifts" and "space shifts" and performs further processing to determine if a detected edge shift indicates a doubles condition. A "regular edge shift" is a condition that may exist between two lines of a cluster where the blocked cells of one line are contiguous with those of an adjacent line at exactly one point as illustrated in FIGS. 10A-10C. These figures are discussed below. A "space shift" is a condition that may exist between two consecutive lines where the blocked cells of the first are not touching those of the second at any point. A doubles condition is detected every time a space shift occurs, but not necessarily every time a regular edge shift occurs. To differentiate between the edge shifts that indicate doubles and those that do not, the program considers the size of the image. Basically, it assumes that an edge shift within a large cluster most likely indicates doubles, while one within a smaller cluster is an inherent part of one object's image.

If the line just scanned is the first line of a cluster, the main program bypasses the Edge Shift, Dimple, Width, Wimple and Corner modules because these modules do not work without the edge positions of a preceding line. A Left Edge Shift module checks to see if either a regular edge shift or a space shift has occurred in the left direction, e.g., as in FIG. 10A, whereas a Right Edge Shift module checks to see if either a regular edge shift or a space shift has occurred in the right direction. All modules are reset and enabled once doubles have been identified by one of the Edge Shift modules. This is because an edge shift which indicates doubles clearly marks the end of one object and the beginning of another. Geometrically, the situation is similar to starting a new cluster. As described above, the modules are always reset and enabled at the start of a new cluster.

Figure 11:
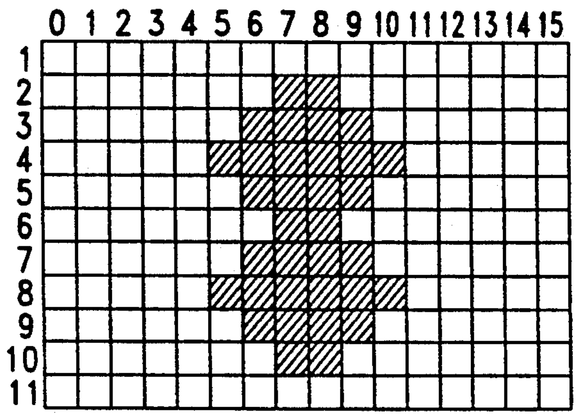
FIG. 11 shows a graphical representation of an image sampled by the sensor array; the image including two dimple characteristics.

The Dimple module is designed to identify entities that overlap along the direction of the flow of the stream of objects. A classic example of entities that overlap in this manner is illustrated in FIG. 11. The left and right edges each include a single "dimple". A "dimple" on the left edge is defined to be an "inward edge movement" to the right, followed by an "outward movement" to the left. If the dimple size is greater than a predetermined threshold, then a doubles condition results.

A Left Dimple routine checks for dimple conditions on the left side of the cluster whereas a Right Dimple routine checks for dimple conditions on the right side of the cluster. To prevent the detection of redundant doubles after doubles are detected by the Right or the Left Dimple module, the Dimple and Corner modules of the opposite side are disabled until either a new cluster begins or an edge shift occurs. Similarly, the Gap module is disabled after a dimple double is detected to prevent a redundant count of doubles.

The Width module quantifies the change in image width from large to small and back to large again. The variable used to represent the extent of this change is "WIDTH." Referring again to FIG. 11, note the manner in which the width or number of blocked cells in each line decreases and then increases as the dimples form. The resulting WIDTH measurement is passed to the Wimple module, which uses it in conjunction with the corresponding dimple size to determine if a condition for doubles exists.

The Wimple module reconsiders undersized dimples that are below the threshold used by the Dimple module. They are reconsidered because many of them do, in fact, indicate legitimate doubles. To confirm that they do, the change in the width of the image in the general vicinity of the dimple is referenced as measured by the preceding Width module. What results is a "wimple" characteristic, comprised of a width change and a dimple. Like the dimple characteristic in the Dimple module, the size of a wimple is quantified and must be above a certain threshold value to legitimately identify doubles. The Wimple module is especially helpful for counting small objects, e.g., small tablets and capsules, where dimples are generally smaller in size than those found with larger objects. The structure of the Wimple module is similar to the Dimple module in that it considers the left side and then the right side of an object.

Figure 12:
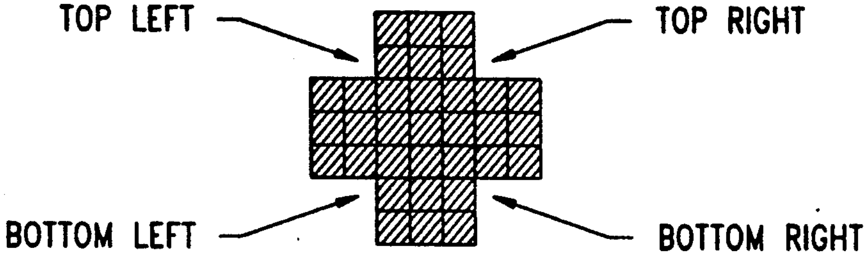
FIG. 12 shows a graphical representation of an image that illustrates examples of the internal corner region detected by the Corner module.

The Corner module also looks for movements in the left and right edges of a cluster that are characteristic of a double. The feature that cues this module that a double is present is an "internal corner" region of clear cells that form a right angle that intrudes upon a region of dark cells. There are four possible corner configurations that can indicate doubles. These configurations are illustrated in FIG. 12.

The Left Corner module first checks for a "top corner" condition in the left edge. If the condition does not exist, the module proceeds to check for a "bottom corner" condition in that edge. Note that after a double is detected, the Gap, Dimple, Wimple and Corner modules of the opposite side are disabled to prevent a redundant count of doubles.

The Area module identifies grossly oversized clusters and counts them as doubles. Two objects may bunch together in such a way that their cluster area is quite large, but lacks the prominent geometric features needed to be recognized and counted by one of the other processing modules. The area module weighs the area of these clusters against a cutoff area. This cutoff value will change depending on the typical size of the objects being counted; the larger the size, the larger the cutoff value. It is calculated after a sampling of the first thirty-two cluster areas that are counted as singles by the other processing modules. Thus, the Area module can only identify doubles after a minimum count of thirty-two has been achieved.

The Area module is unlike the other processing modules in that it is statistically based and is not concerned with the geometric characteristics of the images. Also, the main program passes control to the Area module only after a cluster is completely scanned and counted as a single object by the other processing modules.

Referring again to FIGS. 7A–7B, there is illustrated a flow chart for implementing the main program executed by the system described in FIG. 6 to count objects traversing the sensor array. The flow chart details a plurality of steps indicated by reference numerals 52 to 124 that are performed by the main program to count objects. The numbers in circles indicate the specific areas in the main program where the individual processing modules re-enter the main program execution flow.

Upon commencing execution a "STARTCLUST" flag is set in step 52. This flag, when positive, indicates the presence of a "clear" line, or one without any blocked cells. The program assumes here that there is at least one such line scanned before the first object passes across the sensor plane.

The processing modules which analyze the images of the objects have no interest in the clear lines between clusters. Thus, the program efficiently bypasses such lines by executing a loop indicated by steps 54, 56, 58, 64 and 68. Upon encountering a clear line at step 56, the STARTCLUST status is checked at step 58. Note that STARTCLUST is not yet updated to reflect the status of the "current line," or the line most recently scanned. If STARTCLUST is positive, the previous line is assumed clear and control passes through the foregoing loop. At successive clear lines, this looping repeats until a line with blocked cells is encountered.

It should be noted here that at step 54, if the line is clear, the positions of the blocked cells "LE" and "RE," and the variable "CELLS" are undefined. However, if the line contains blocked cells, LE indicates the position in the array from zero to fifteen of the left most blocked cell and RE indicates the position of the right most blocked cell. The convention used here is that the first cell on the left occupies position zero. FIG. 10A shows the cell positions labeled in this fashion. The variable CELLS is a count of the total number of blocked cells in a line that reside to the left of a gap condition, should any exist. This variable is used by the Edge Shift and Area modules.

STARTCLUST plays an important role in the main program as it indicates the beginning and the end of a cluster. The first line of a cluster by definition is the first with blocked cells to occur after one or more clear lines. Thus, when the program encounters a line with blocked cells, the status of STARTCLUST is checked in step 70. There, STARTCLUST is not yet updated to reflect the status of the current line. Thus, a positive STARTCLUST indicates that the previous line is clear and so the current line is the first of a new cluster. Control passes to steps 72, 74 and 76 which reset and enable the variables and flags of the processing modules. The counter is incremented by one to indicate the presence of at least one object in the new cluster, and "CLUSTCOUNT", a variable which counts the number of objects in each cluster, is set to one.

Continuing the processing at the first line of the cluster, control passes to step 78, the Gap module, and emerges at the circled point 8 as described below. Control does not pass to the Edge Shift, Dimple, Width, Wimple, or Corner modules, however, as these require information from a second line in the cluster. Thus, STARTCLUST is checked at step 80 just as it was checked at step 70 to confirm that the current line is the first in the cluster. Control passes through steps 82, 66, 64, 68, and 54. At step 82, information about the first line is stored in the variable TOTA which will be referenced later by the Edge Shift and Area modules. At step 66, STARTCLUST is set to zero in order to represent the status of the current line, which is not clear. Following this, the program moves to the next line at step 64. To store the edge positions of the previous line, the variables "LEL" and "REL" are set to equal the edge positions LE and RE respectively in step 68. In step 54 the new edge positions and a new value for CELLS are retrieved.

For illustrative purposes, assume that the next line scanned comprises the second line of the cluster. At step 56, the main program determines that this line is not clear. Control then passes to steps 70 and 78. Supposing that no doubles are identified by the Gap module in step 78, control goes to the circled point eight. Testing STARTCLUST at step 80 confirms that the line is not the first in the cluster and control goes to the remaining processing modules. If no doubles are detected by any of these, control goes from step 122 to step 66. If a doubles condition is identified by any one of the modules, the program bypasses whatever modules remain in the sequence and returns to step 66. For each of the successive lines, if they contain blocked cells, control passes through one of the foregoing loops beginning with the steps 54, 56, 70 and 78.

The processing of the loops described above continues at each line in the cluster until a clear line appears. The program uses STARTCLUST to identify this particular line at the end of the cluster. As described above, the Area module only evaluates a cluster once the program has scanned all of it. By using STARTCLUST, control passes to the Area module at the appropriate time.

Now addressing the flow chart, suppose that the current line is the first clear line after a cluster; STARTCLUST is still zero at step 54. At step 56, the clear condition is confirmed and control goes to step 58. Since STARTCLUST is zero, control passes to the Area module which is described below. After emerging from this module, STARTCLUST is updated at step 62. The program then advances to the next line at step 64.

The program will now advance past the succeeding clear lines, as described above, until it finds the beginning of the next cluster.

The modules are enabled by setting their respective "enable flags" positive. Similarly, the modules are disabled by clearing their respective "enable flags". These flags include GAPMETH, LDIMP, RDIMP, LCORN and RCORN. When a module is enabled, it is able to identify doubles and increment the count. As described above, there is a need to effectively disable some of the processing modules under certain conditions of doubles.

The Dimple, Wimple and Corner modules each have enable flags which are tested at the beginning of each module. If one of these module's enable flag is positive, the module is enabled, and therefore, processing through the module continues. If the module's enable flag is cleared, processing exits the module and control is passed back to the main program. Control is then passed to the next module in the main program hierarchy.

The Gap module has an enable flag, "GAPMETH", which when cleared prevents that module from identifying doubles. The Gap module is the only one with an enable flag that is not positioned at the beginning of the module. Unlike the other modules, however, when it is disabled it continues operating at each line to identify gaps. The reason for this is that the Edge Shift modules require the lines they process to contain no gaps. Because they may count redundantly if that requirement is not met, a precaution is taken to reset the Edge Shift modules at every gapped line. This effectively prevents them from miscounting as resetting erases much of the geometrical information needed to identify doubles.

Flags "LDIMP" and "RDIMP" are enable flags which, when set, enable the Left and Right Dimple modules respectively, as well as the Left and Right Wimple modules. Flags "LCORN" and "RCORN" are enable flags which, when set, enable the Left and Right Corner modules. The Edge Shift and Area modules are always enabled so there is no need for a flag to prevent these modules from identifying doubles.

As mentioned above, resetting the processing modules effectively erases any information acquired concerning the geometry of a cluster. All of the modules except the Area module are reset at the first line of every cluster and at the line where a doubles condition is detected. Resetting is required at the first line of a cluster because the variables and flags of the modules still contain information relevant to the previous cluster. Resetting when a doubles condition is detected is a conservative measure necessary to prevent redundant counting. This is a third such precaution implemented; as described previously, certain modules are disabled for the remainder of the cluster and others are bypassed at the line where the doubles are indicated.

The reset values for the relevant variables and flags of each module are set forth below. The Wimple modules' reset values are not shown exclusively because their variables are actually the same ones used by the Dimple and Width modules.

| MODULE | FLAG AND VARIABLE VALUES AT RESET |
|---|---|
| Gap | PREGAP = LEADGAP = 0 |
| Edge Shift, Left | TOTA = PREA = ESENTA = ESFLAG = 0 |
| Edge Shift, Right | TOTA = PREA = ESENTA = ESFLAG = 0 |
| Dimple, Left | LDIMPIN = LDIMPOUT = LDIMPSIZ = 0 |

-continued

| MODULE | FLAG AND VARIABLE VALUES AT RESET |
|---|---|
| Dimple, Right | RDIMPIN = RDIMPOUT = RDIMPSIZ = 0 |
| Width | WIDIN = WIDOUT = WIDTH = 0 |
| Corner, Left | LVERT = LHORIZ = 0 |
| Corner, Right | RVERT = RHORIZ = 0 |

Figure 13:
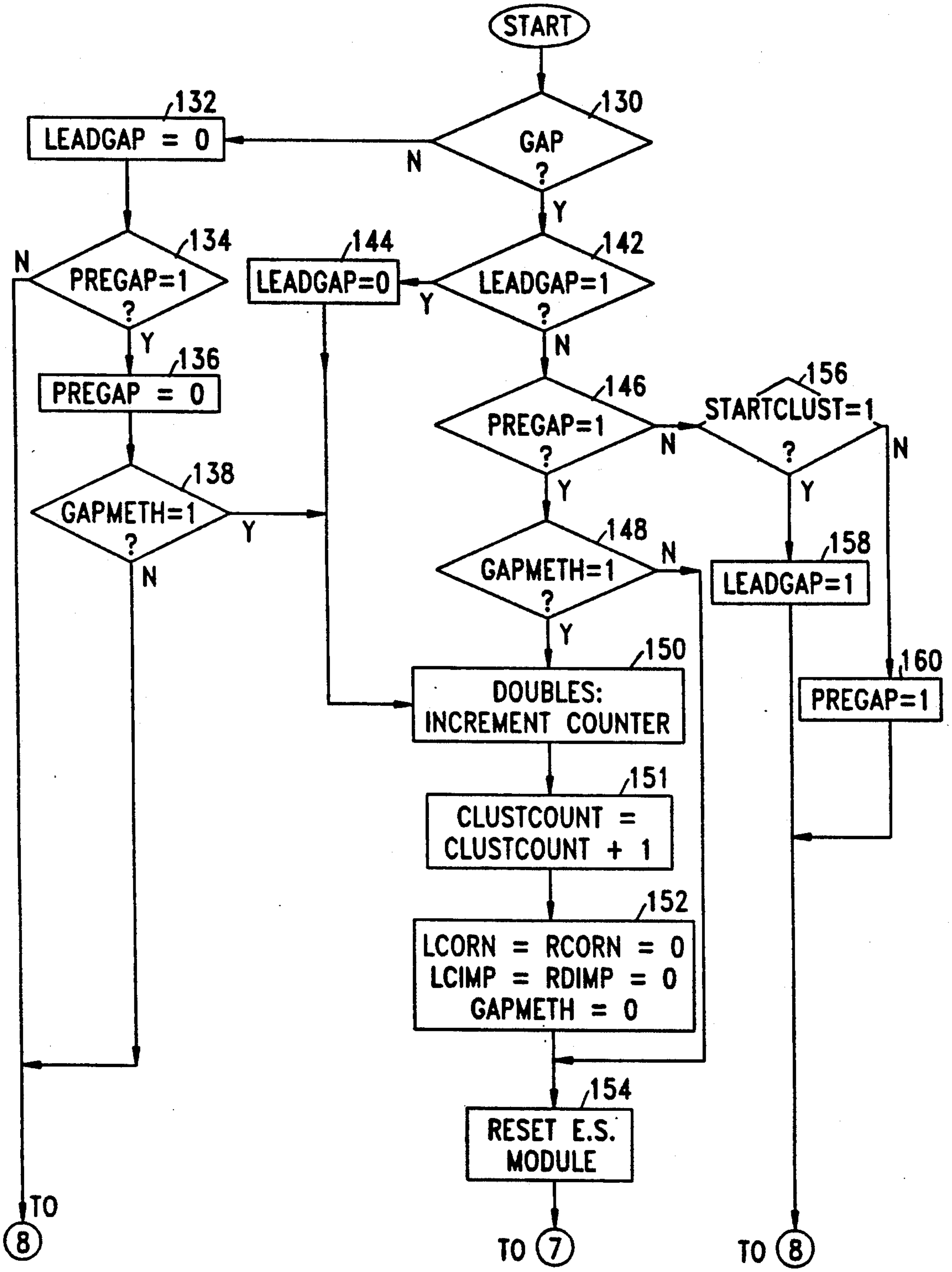
FIG. 13 illustrates a flow chart for implementing the Gap module.

Referring now to FIG. 13, there is illustrated a flow chart for implementing the Gap module. The flow chart details a plurality of steps indicated by reference numerals 130 to 160 that are performed by the Gap module to identify gaps and detect doubles. The numbers in circles indicate the return points in the main program as illustrated in FIG. 7A.

The Gap module disregards the gaps due to noise, which, as discussed above, occur on the first and last lines of a cluster. The first line of a cluster is referred to as the "leading edge" and the last, the "trailing edge". A flag "LEADGAP" is used to indicate a gap at the leading edge. A "PREGAP" flag indicates the presence of a gap which is not at the leading edge.

The Gap module detects doubles by comparing the gapped or ungapped condition of the current line with that of the previous line. Certain combinations of gapped and ungapped conditions at each line indicate doubles conditions. For example, doubles are not identified when the current line contains a gap and the previous one does not. This is because the current line could be the trailing edge, in which case the gap would be due to noise. A flag PREGAP is set to indicate the existence of the gap, and the program advances to the next line. If this line is not clear, then the previous line is confirmed to be something other than the trailing edge. The Gap module tests the PREGAP flag, and its positive state then indicates a legitimate doubles condition.

Because the Gap module is only concerned with the status of two consecutive lines at any one time, whenever the flags PREGAP or LEADGAP are tested, they represent the gapped or ungapped condition at the previous line only. A LEADGAP flag that is tested to be positive not only indicates that a gap resides at the leading edge, but also that the preceding line is the leading edge. Likewise, when PREGAP is tested positive, it signifies the existence of a gap at the preceding line and none other. Due to this subtlety in definition, LEADGAP and PREGAP are cleared or set at various points in the Gap module program.

Upon entering the module, a check for a gapped condition on the current line is performed at step 130. If a gap is not found, the LEADGAP flag is cleared in step 132 to reflect the condition of the current line, which may be the leading edge.

A check is then made at step 134 to determine if the PREGAP flag is set. If PREGAP is not set, control is passed back to point eight in the main program. If the PREGAP flag is set, a condition for doubles exists; a gap which is not on the leading edge is followed by a line without gaps. Upon determining this, the PREGAP flag is cleared in step 136 to reflect the ungapped condition of the current line. Next, GAPMETH, the enable flag, is checked in step 138. If it is not set, control is then passed to point eight in the main program (see FIG. 7A). If the GAPMETH flag is set, control passes to step 150 to increment the counter to account for the doubles condition detected. To update the number of objects counted thus far in the cluster, the variable CLUST- COUNT is incremented by one in step 151. Step 152 is then executed to clear the enable flags of the Corner, Dimple, Wimple and Gap modules. This is done to prevent doubles from being counted more than once. The Edge Shift module is reset in step 154 for the reasons described above. Control then passes to point seven in the main program (see FIG. 7A). If upon entering the Gap module, a gapped condition on the current line is detected in step 130, control passes to step 142 where the LEADGAP flag is tested. If it is positive, then valid conditions for doubles exist; there is a gap at the leading edge which is followed by another on the next line. LEADGAP is cleared in step 144. Control then passes to step 150 to increment the counter to account for the doubles detected. Note that the GAPMETH flag is not checked before the count is incremented for this particular case of doubles. This is because the GAPMETH flag is always set at the beginning of a cluster as are all of the enable flags in step 74 of the main program (see FIG. 7A). In step 152, the flags relevant to the Corner, Dimple and Wimple modules and also the GAPMETH flag are cleared so that none of these modules may identify doubles in subsequent scans. The Edge Shift module is reset in step 154 and then control is passed back to point seven in the main program (see FIG. 7A).

If it is determined the LEADGAP flag is not set in step 142, then the PREGAP flag is tested in step 146. If the PREGAP flag is not set, control passes to step 156 where the STARTCLUST flag is tested to determine if it is set. If the flag is set, then the current line is the leading edge of the cluster. The LEADGAP flag is set in step 158, and then control passes back to point eight in the main program. If the STARTCLUST flag is not set, the PREGAP flag is set in step 160 to indicate the presence of a gap on a line which is not the leading edge.

Control then passes back to point eight in the main program (see FIG. 7A).

If the PREGAP flag is set when tested in step 146, there exists a gap on the line previous to the current one. Since the current line is gapped, as was determined in step 130, there are two consecutive gapped lines. This indicates a doubles condition. The GAPMETH flag is checked in step 148. If it is set, control passes to step 150 to increment the counter to account for the doubles detected. To update the number of objects counted in the cluster, the variable CLUSTCOUNT is incremented in step 151. In step 152, the enable flags for the Corner, Dimple, Wimple and Gap modules, LCORN, RCORN, LDIMP, RDIMP and GAPMETH are cleared. The Edge Shift module is reset in step 154 and then control passes back to point seven in the main program (see FIG. 7A).

If it is determined in step 148 that the GAPMETH flag is not set, control passes to step 154 to reset the Edge Shift module and then control passes back to point seven in the main program (see FIG. 7A). The Gap module detects a gap in step 130 so that the Edge Shift modules can be reset in step 154, even when the GAPMETH flag has been cleared. This prevents redundant counting by the Edge Shift modules, as discussed above.

Referring now to FIG. 9A, there is illustrated an example of conditions in a cluster where the Gap module detects doubles. At the first line of the cluster, PREGAP and LEADGAP are set to zero in step 76 in the main program (see FIG. 7A). Once control is passed to the Gap module, the tests in steps 142 and 146 there yield negative outcomes. At step 156 the program confirms that this is the leading edge of the object by checking the value of the STARTCLUST flag. Because STARTCLUST is set and the current line is gapped, the LEADGAP flag is then set in step 158 and control passes to the main program via point eight. On the next line, the Gap module determines that it is also gapped, and doubles result because the LEADGAP flag is detected to be set in step 142.

Referring now to FIG. 9B, there is illustrated a second example of the conditions of the cluster where the Gap module detects doubles. Under these conditions, the Gap module primarily uses the PREGAP flag. Upon detecting a gap at line four, the program sets the PREGAP flag positive in step 160. After identifying the gap in the subsequent line, the PREGAP flag is checked in step 146. Since the PREGAP flag is set and the Gap module is enabled, i.e., the GAPMETH flag is set, doubles are detected in step 150.

Referring now to FIG. 9C, there is illustrated a third example of the conditions of the cluster where the Gap module detects doubles. At line five, since there is a gap, PREGAP is set in step 160. Then at the following line, which is not gapped, doubles result after the line's ungapped condition is confirmed in step 130, the PREGAP flag is found to be set in step 134 and the GAPMETH flag is found to be set in step 138.

If control passes from the Gap module to the main program via the path designated by the number eight, the STARTCLUST flag is tested in step 80 (see FIG. 7A). Again, this ascertains whether or not the current line is the leading edge. If the current line is the leading edge, the remaining modules are bypassed because they do not operate without all the values for the variables LE, LEL, RE and REL; a second line must be scanned. If it is not the leading edge, control passes to the Left Edge Shift module. If control passes from the Gap module to the main program via the path designated by the number seven, the STARTCLUST flag is set to zero in step 66 and control is passed to steps 64 and 68 and then to step 54 where the main loop of the main program is repeated.

If the current line is the leading edge, the program exits the Gap module to execute step 82 where the variable TOTA relevant to the Edge Shift and Area modules is updated. This is necessary as the Edge Shift modules are inoperative at the leading edge. TOTA is updated here by setting it equal to CELLS. CELLS is a variable indicating the number of blocked cells scanned prior to a gap, if any exists, on the current line. Its value is determined by the programmed microprocessor system 50 in step 54 when the current line is read (see FIG. 7A). Control passes to step 66 where the STARTCLUST flag is set to zero. Steps 64, 68 and 54 are then executed to retrieve the next line scanned and to update the various edge positions LE, LEL, RE and REL along with CELLS. If the next line is not clear, control will pass to steps 56 and 70 and proceed from there to the processing modules.

If upon testing STARTCLUST in step 80, it is determined that it is not equal to one, control is passed to the Left Edge Shift module as indicated in step 84. As described above, a regular edge shift is a condition between two consecutive lines where the blocked cells of the first line are contiguous with those of the second line at exactly one point. To describe the regular edge shift's location, the regular shift is designated as occurring "at a specific line", meaning that there is a regular edge shift between this line and the line that precedes it.

Due to the limited resolution of images from the sensor array, a regular edge shift may not always indicate the division point between two objects. Such misleading or "insignificant" regular edge shifts most often occur in the images of small or thin objects which are diagonally orientated as they cross the sensor plane. If these objects become bunched together as they pass over the sensor array, the result may be a cluster with both types of regular edge shifts: those that separate one object from the next, and those that are inherent to the image of one object. FIG. 10C shows some insignificant shifts at lines three, four, and five, and a "significant" edge shift, indicating the break between the two objects, at line six. The Edge Shift module discerns which regular edge shifts are significant and which are not.

The Edge Shift module does this by examining the size of a cluster as it is scanned. Larger cluster portions with a regular edge shift included most likely represent two objects, while a smaller cluster with one or more regular edge shifts will most likely represent a single object. A cutoff area represented by a variable "MAXESENTA" is chosen to indicate the maximum area that a single object may legitimately have with one or more regular edge shifts included in its image. If an object is larger than MAXESENTA and includes regular edge shifts, then at least one of those shifts must indicate doubles.

A cumulative area of blocked cells is tallied at each line by adding the successive CELLS values and storing it in the variable TOTA. TOTA represents the partial or whole area of the object that is most recently counted. Thus, when doubles are detected and a new object is counted, there is a need to update this value so that it reflects the area of this new object. This can be done readily, as the object begins at the line where the significant edge shift occurs. The resetting of TOTA and the need for such a variable is described in more detail below.

Suppose that the analysis of a cluster with one edge shift is conducted. Upon detecting an edge shift, the program checks the value of TOTA. If TOTA is greater than MAXESENTA, the shift is deemed significant, and the count increments. The area before the shift is considered to be the complete area of the first object. TOTA then resets to be the number of cells in the current line, which is the partial area of the second object.

If an edge shift is detected at a line where TOTA is less than or equal to MAXESENTA, the shift is insignificant. However, at a succeeding line in the cluster when TOTA grows to exceed MAXESENTA, this same shift is deemed significant, and the count increments. The reset of TOTA for this case is more difficult and must take into account the blocked cells located between the shift and the current line. This is accomplished by maintaining a variable "ESENTA" which is the tallied area of blocked cells before the edge shift. At the line where the insignificant shift becomes significant, TOTA is updated by the following expression:

$$TOTA\ (new) = TOTA\ (original) - ESENTA.$$

Thus, there are two types of doubles that result from regular edge shifts. The first type is when the shift occurs at a line where TOTA is already greater than MAXESENTA, and the second type is when the shift occurs at a line which precedes the line containing the (MAXESENTA+1)th cell. If there is more than one regular edge shift preceding this line, the significant edge shift is chosen to be the one which is the closest to this line. Referring to FIG. 10C, suppose that the blocked cell in line two is clear. All of the edge shifts in the cluster would then be at lines which precede line seven, where TOTA is just greater than the MAXESENTA value of five. Thus, the significant edge shift is the one at line six because it is closest to line seven.

Figure 14:
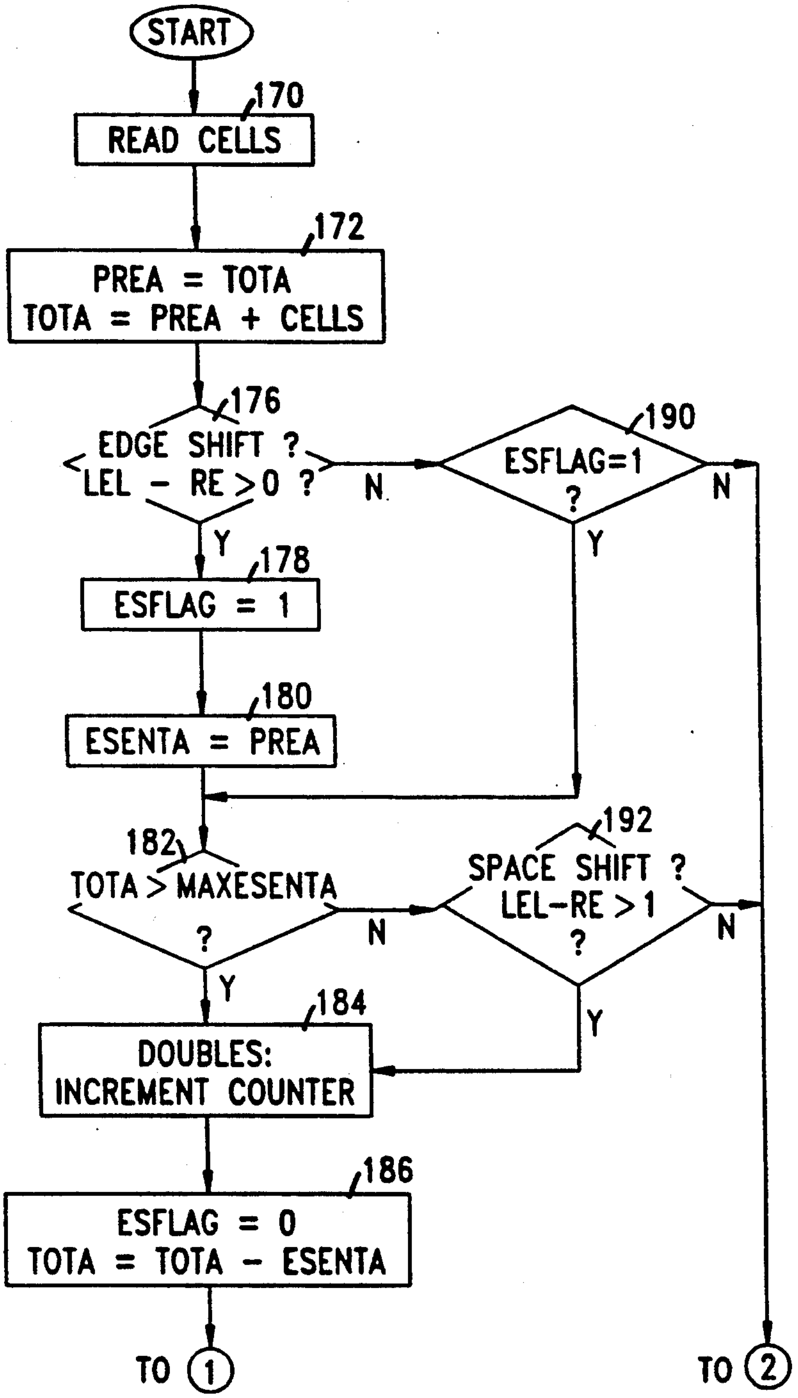
FIG. 14 illustrates a flow chart for implementing the Left Edge Shift module.

Referring now to FIG. 14, there is illustrated a flow chart for implementing the Left Edge Shift module. The flow chart details a plurality of steps indicated by reference numerals 170 to 192 that are performed by the Left Edge Shift module to detect doubles. At the start of a cluster, the variables TOTA, PREA and ESENTA are set to zero. A flag "ESFLAG" which indicates the presence of an edge shift at a line is also set to zero. This constitutes the reset for the Left Edge Shift module which occurs at step 76 in FIG. 7A along with the reset of the other modules.

After the routine is started, step 170 checks the value of the variable CELLS. Step 172 is executed to set PREA equal to the TOTA value of the preceding line. Also in this step, an updated value for TOTA is calculated by adding this PREA (the old TOTA) to the current value of CELLS. PREA is a variable which is equal to the expression of current variables TOTA—CELLS. It is used to readily define ESENTA in step 180 should a regular edge shift occur. As described above, ESENTA is the portion of cells which precede the line where the edge shift occurs. If more than one edge shift occurs, ESENTA is the area which precedes the most recent edge shift.

Control is passed to step 176 where the edge positions of the current and preceding lines are examined to determine if a left edge shift of either regular or space type exists. If one is detected, the ESFLAG is set in step 178 and ESENTA is set to equal PREA in step 180. If no shift is detected, control passes to step 190 where the ESFLAG is checked to determine if it is set. If it is set, steps 178 and 180 are skipped and control passes to step 182. If ESFLAG is not set, control is passed to point two of the main program (see FIG. 7A).

In step 182, TOTA is checked to determine if it exceeds the constant MAXESENTA which, for the exemplary embodiment, equals five. If it does, the counter is incremented in step 184 to indicate that doubles have been detected. If TOTA is not greater than MAXESENTA, then step 192 is executed to determine if a space shift is detected. If a space shift is detected, control is passed to step 184 where the counter is incremented to indicate that doubles have been detected. If no space shift is detected, control is passed back to point two of the main program (see FIG. 7A).

After step 184 is executed, step 186 is executed to clear ESFLAG and update TOTA to reflect the area of the object that was just identified and counted in step 184. Control is then passed back to point one of the main program (see FIG. 7A).

FIGS. 10A–10C illustrate the operation of the Edge Shift modules to detect doubles. The following operations are employed by the Left Edge Shift module to detect doubles in FIG. 10A. Upon detecting the edge shift at line 4, the module checks TOTA at step 182, which is six. Since TOTA is greater than MAXESENTA, the shift is significant, and the count increments. The area of six cells before line four is regarded as a separate object and TOTA resets to be the number of cells in line four. Since no more edge shifts are found in the succeeding lines, the cluster represents two objects and is counted correctly by the Left Edge Shift module.

FIG. 10B represents the case of doubles where the edge shift is detected at a line where TOTA is less than or equal to MAXESENTA. Because TOTA is only five at line three, the shift there is insignificant. However, later in the cluster at line four, TOTA exceeds the MAXESENTA value of five, and the shift is now significant. The count increments and the cluster is correctly interpreted by the Left Edge Shift module to be two objects. Note that if the remaining modules in the hierarchy were not reset or bypassed at this point, an internal corner condition would be identified as doubles or by the Left Edge Shift module. The cluster would then be counted incorrectly as three objects.

FIG. 10C illustrates the case when more than one edge shift is located before the line where TOTA first exceeds MAXESENTA. As described previously, it is assumed that the significant edge shift is the one closest to the line where TOTA becomes greater than MAXESENTA. Since TOTA becomes greater than MAXESENTA at line six, the edge shift there is significant, and two objects are counted. In actuality, this could be, e g., the image of a thin capsule on its side, contiguous with another on its belly.

In the situation illustrated in FIG. 10C, ESENTA is updated in step 180 at every insignificant edge shift; at line three, it becomes one, at line four, it becomes two, and so on. Once the significant edge shift is identified, TOTA is updated by subtracting ESENTA from its current value in step 186. The resultant TOTA reflects the partial area of the second object in the cluster. Should any more edge shifts follow, a third object can be identified by the same foregoing process.

Once doubles have been identified, control passes from the Left Edge Shift module to the main program via the path designated by the number one. All modules are enabled in step 88, and all are reset in step 90 except for the Edge Shift modules. This is because both Edge Shift modules are effectively reset in step 186 (see FIG. 14). Note that the resetting here is different than the usual reset for these modules listed in the chart above because of the special reset required for TOTA.

Continuing with the processing, the variable CLUSTCOUNT is incremented in step 91, the STARTCLUST flag is set to zero in step 66 and control is then passed to step 64 where the foregoing loop is repeated.

If control passes from the Left Edge Shift module to the main program via the path designated by the number two, as occurs when no doubles are determined, control passes to the Right Edge Shift module at step 86. This module is nearly identical to the Left Edge Shift module as it shares the same variables and flag. In fact, the direction of the shift is arbitrary to the double detection process. Two modules, a Right and a Left, are set up for structural purposes. The only relevant difference between the Left and Right Edge Shift modules is that the Right Edge Shift module checks for a right edge shift condition whereas the Left Edge Shift module checks for a left edge shift condition.

A left edge shift exists if the expression (LEL--RE>0) at step 176 in the flow chart of FIG. 14 is true. A left space shift is true if the expression (LEL--RE>1) at step 192 tests true. In the processing for the Right Edge Shift module, the expressions set forth in steps 176 and 192 in FIG. 14 are replaced by (LE--REL>0) and (LE−REL>1), respectively. The rest of the processing for the Right Edge Shift module is identical to that of the Left Edge Shift module.

Figure 15:
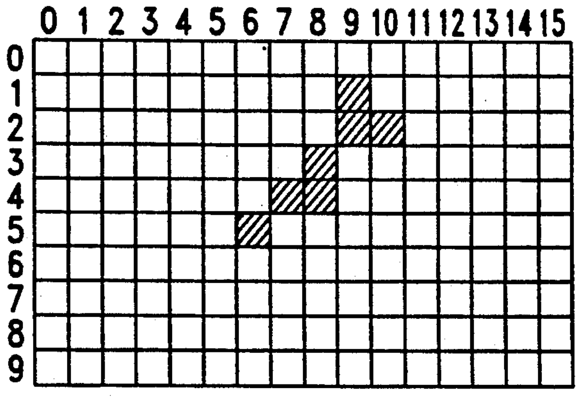
FIGS. 15 shows a graphical representation of an image sampled by the sensor array and processed by the programmed microprocessor system that show an edge shift characteristic and a table of variables as calculated by the Edge Shift Module.

Referring now to FIG. 15, there is illustrated a graphical representation of an image sampled by the sensor array and processed by the programmed microprocessor system and a table which tabulates the values of the variables and flags utilized by the Left Edge Shift module. The image in FIG. 15 illustrates two objects which touch at the edge shift at line three.

Since all the shifts shown are left edge shifts, only the Left Edge Shift module is relevant. The values shown in the table illustrated in FIG. 15 are valid either at step 184 of the Left Edge Shift flow chart in FIG. 14 or when the program passes control to point two of the main program.

As indicated in line one of the scanned image, there is one cell blocked. However, the Edge Shift module is bypassed at step 80 (FIG. 7A) in the main program because the STARTCLUST flag is equal to one. At step 82, TOTA is updated to be CELLS which is one. The program then advances to the next line.

At line two, PREA is set to equal the TOTA value of the previous line, and TOTA is calculated by adding this PREA value to number of cells blocked in the current line, i.e., two, in step 172. Thus, TOTA is now three. No edge shift is detected in step 176 because LEL is nine and RE is ten; LEL−RE>0 is not true. Since the ESFLAG tests clear in step 190, control exits the Left Edge Shift module and passes to point two of the main program.

The same procedure is repeated for line three where TOTA is calculated to be four in step 172. A left edge shift is detected in step 176 because LEL (nine) minus RE (eight) is greater than zero. The ESFLAG is set in step 178 and ESENTA is set equal to the current PREA value in step 180. Doubles are not detected in step 182 since TOTA is not greater than MAXESENTA, which is five. Also, no space shift is detected in step 192 because LEL minus RE is not greater than one. Control passes to point two of the main program.

At line four, doubles are detected because TOTA is calculated to be six in step 172 and the ESFLAG is still set from the edge shift at the previous line. In effect, the break between the first and second objects is the edge shift at this previous line. The counter is incremented in step 184, the ESFLAG is cleared, and TOTA is reset by subtracting ESENTA (three) from the current TOTA value (six) in step 186. This yields a new TOTA value of three (refer to the column of the table entitled "updated TOTA.") The updated TOTA value is the count of the three blocked cells in lines three and four which now represents part of the second object At line five, the processing by the Left Edge Shift module continues. TOTA is calculated in step 172 to be four; the value of TOTA utilized in step 172 to update PREA is three. Another edge shift is detected in step 176, however, since TOTA is not greater than five in step 182, no doubles are valid.

Control is passed to the Left Dimple module if control passes to the main program from the Right Edge Shift module via point two. The Dimple modules are designed to identify two objects in a cluster that overlap such that the top lines of the cluster comprise the first object and the bottom lines make up the second object. One or more lines near the center of the cluster comprise a region of overlap that is common to both objects.

A classic example is two round objects that overlap to form an hourglass shape. If the dimple size is greater than a predetermined threshold, then doubles result, and the count is incremented.

The Dimple module comprises a separate routine for the left edge and the right edge. Each routine attempts to identify dimples by identifying the inward movement of an edge that is greater than one cell and an outward movement that follows that is greater than one cell. These requirements exist to compensate for the noise level of one cell that is inherent in the imaging process. Dimples having a total inward and/or outward movement of just one cell are often characteristic of single objects.

The module detects a dimple by looking at the relative changes in the edge position of a cluster. The position of the left edge is compared with the position of the previous left edge and the position of the right edge is compared with the position of the previous right edge to determine which way the edge is moving. For either edge, a positive edge change is defined as a change which results in a movement of the edge away from the center of the cluster. A negative edge change results from a movement of the edge toward the center of the cluster. A dimple is indicated when a negative edge change is followed by a positive edge change. Quantitatively, the variable "DLE" is defined as the change in left edge positions (Delta Left Edge) between the previous and current lines. These left edge positions are designated by the variables LEL and LE. Likewise, the variable "DRE" is the change in right edge positions. In accordance with the above sign convention, DLE and DRE are calculated by the following equations:

$$DLE = LEL - LE$$

$$DRE = RE - REL$$

A principle task of the Dimple module is to compute DLE and DRE at each line and check for a change in these values from negative to positive. To accomplish this the successive negative DLE values and the successive positive DLE values are tallied as variables LDIMPIN and LDIMPOUT, respectively. The absolute value of the summed negative values is taken for LDIMPIN. To check for doubles, the module simply checks to see if these variables are each greater than one.

A variable LDIMPSIZ is representative of the sum of LDIMPIN and LDIMPOUT. Since LDIMPIN or LDIMPOUT may be equal to one, LDIMPSIZ may indicate the "size" of a dimple which results from noise. This value is of no interest to the Dimple routines, but is used by the Wimple routines that follow.

Figure 16:
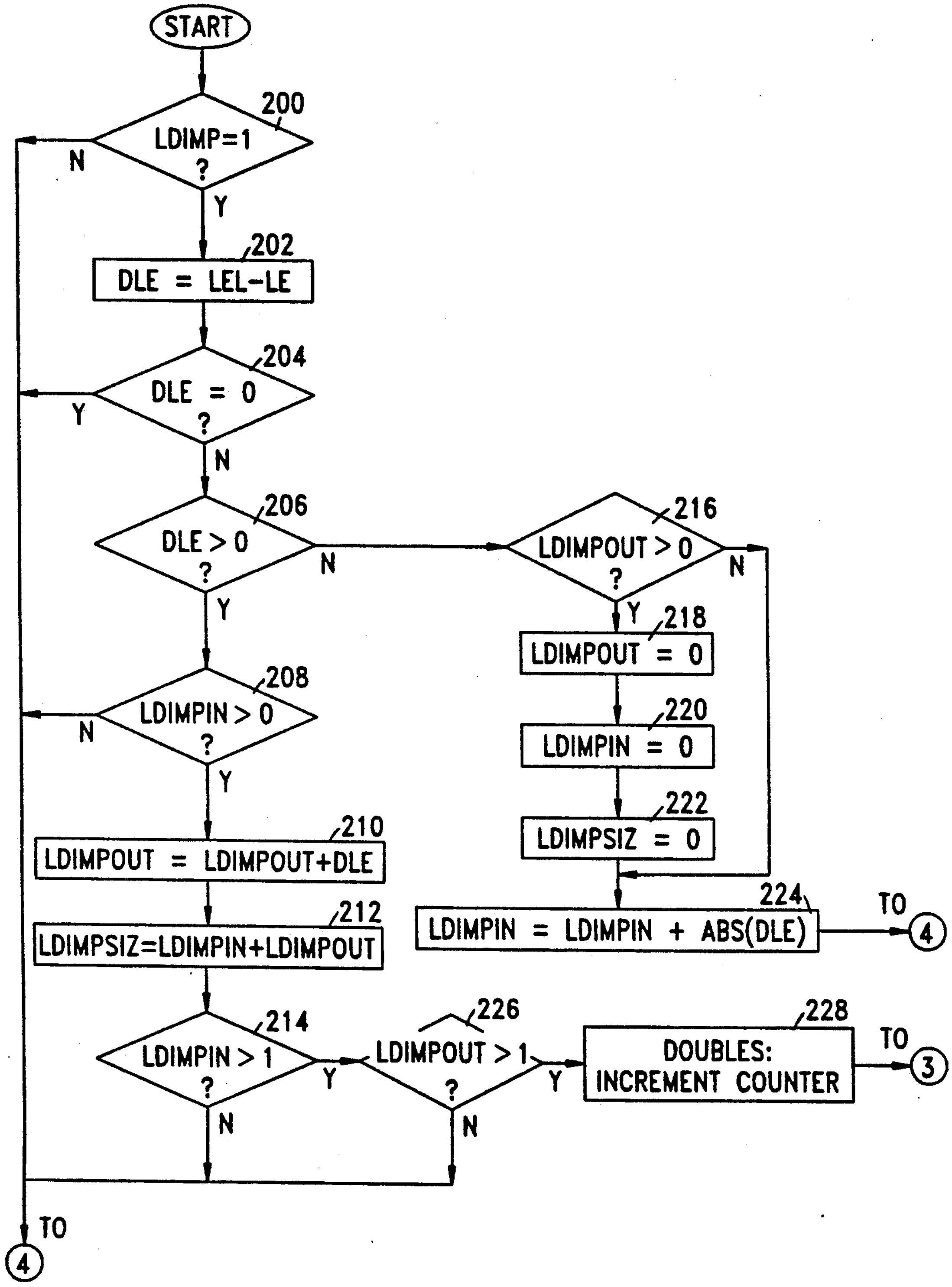
FIG. 16 illustrates a flow chart for implementing the Left Dimple module.

Referring now to FIG. 16, there is illustrated a flow chart for implementing the Left Dimple module. The flow chart details a plurality of steps indicated by reference numerals 200 to 228 that are performed by the Dimple module to detect doubles. The numbers in circles indicate the return point in the main program as illustrated in FIGS. 7A–7B. The values of the variables utilized by the Left Dimple module at the start of each cluster are equal to their reset values defined above.

Upon being invoked by the main program, the Dimple module executes step 200 by testing the LDIMP flag to determine if it is set. If the flag is not set, then the Left Dimple module is not enabled and control is passed to point four of the main program (see FIGS. 7A–7B). If the LDIMP flag is set, DLE is calculated in step 202.

DLE is then tested in step 204 to determine if it is equal to zero. If DLE equals zero, control is passed to point four of the main program (see FIGS. 7A–7B) because when DLE equals zero, there is no edge change. The values of LDIMPIN and LDIMPOUT, which represent edge movement, remain unchanged in such a case.

In step 204, if DLE is nonzero, a positive or negative edge movement exists and DLE is again tested in step 206 to determine if it is positive. If it is, an outward edge movement is indicated and control passes to step 208 where LDIMPIN is tested. A positive LDIMPIN value there indicates a previous inward edge movement in the cluster. Step 208 serves to check that such a movement exists since the module is only interested in the outward edge movements that are preceded by inward edge movements. If LDIMPIN is not a positive value, control is passed to point four of the main program (see FIG. 7B). If LDIMPIN is a positive value, steps 210 and 212 are executed to calculate LDIMPOUT and LDIMPSIZ.

The next step 214 again tests LDIMPIN to determine if it is greater than one. If it is not, control is passed back to point four of the main program (see FIG. 7B). If LDIMPIN is greater than one, LDIMPOUT is tested to determine if it is greater than one. If it is not, control is passed back to point four of the main program (see FIG. 7B). If LDIMPOUT is greater than one, doubles have been identified. As a result, step 228 is executed which increments the counter and then control is passed back to point three of the main program (see FIG. 7B).

If at step 206 it is determined that DLE is not positive, then it is negative because of the outcome of step 204. Such a DLE condition means that an inward edge movement exists at the current line. At the next step 216, LDIMPOUT is checked. If it is positive, an outward movement has already occurred at some line or lines that precede the current line. This movement will not be part of the potential dimple that is beginning to form at the current line. Thus, the edge information about the old outward movement is discarded by setting LDIMPOUT and LDIMPSIZ to zero in steps 218 and 222. The variable LDIMPIN is also set to zero in step 220 because it references the inward movement that occurs before the outward movement represented by LDIMPOUT. Step 224 is then executed to calculate a new value for LDIMPIN. Control is passed back to point four of the main program (see FIG. 7B).

If at step 216 it is determined that LDIMPOUT is not a positive value, steps 218, 220 and 222 are skipped. Step 224 is executed to calculate a new value for LDIMPIN and then control is passed back to the point four of the main program (see FIG. 7B).

If control passes from the Left Dimple module to the main program via the path designated by the number three, the enable flags for the Right Corner, Dimple and Wimple modules, RCORN and RDIMP, are set to zero in step 94, the enable flag for the Gap module, GAPMETH, is set to zero in step 100, all modules are reset in step 102, the variable CLUSTCOUNT is incremented in step 91, the STARTCLUST flag is set to zero in step 66 and control is then passed to steps 64, 68 and 54 where the foregoing loop is repeated.

As set forth above, the principle task of the Dimple module is to compute DLE and DRE and check for a change in these values from negative to positive. Set forth below is a table which tabulates the changes in edge position for the cluster illustrated in FIG. 11. Two dimples are illustrated to lie between lines four and eight and are characterized by the change in DLE and DRE from negative to positive as indicated below.

| LINE | LE | DLE | RE | DRE | LDIMPIN | LDIMPOUT |
|---|---|---|---|---|---|---|
| 1 | — | — | — | — | — | — |
| 2 | 7 | — | 8 | — | 0 | 0 |
| 3 | 6 | +1 | 9 | +1 | 0 | 0 |
| 4 | 5 | +1 | 10 | +1 | 0 | 0 |
| 5 | 6 | −1 | 9 | −1 | 1 | 0 |
| 6 | 7 | −1 | 8 | −1 | 2 | 0 |
| 7 | 6 | +1 | 9 | +1 | 2 | 1 |
| 8 | 5 | +1 | 10 | +1 | 2 | 2 |
| 9 | 6 | −1 | 9 | −1 | 1 | 0 |
| 10 | 7 | −1 | 8 | −1 | 2 | 0 |

If control passes from the Left Dimple module to the main program via the path designated by the number four, control is passed to the Right Dimple module as indicated in step 96. This module is nearly identical to the Left Dimple module. The relevant difference between the modules is that the Right Edge Shift module utilizes the variables RDIMPIN, RDIMPOUT and RDIMPSIZ and the edge change term DRE. DRE must be found using the equations listed above in order to maintain the proper sign convention. Unlike the Left and Right Edge Shift modules, which compliment each other, the two Dimple modules are completely independent as they share no common variables or flags.

If control passes back from the Right Dimple module to the main program via the path designated by the number three, the enable flags for the Left Corner, Dimple and Wimple modules, LCORN and LDIMP, are set to zero in step 98, the enable flag for the Gap module, GAPMETH, is set to zero in step 100, all modules are reset in step 102, the variable CLUSTCOUNT is incremented in step 91, the STARTCLUST flag is set to zero in step 66 and control is then passed to step 64 where the foregoing loop is repeated.

If control passes back from the Right Dimple module to the main program via the path designated by the number four, control is passed to the Width module as indicated in step 104. The main function of the Width module is to calculate a variable WIDTH which is representative of a measurement of the change in the width of a cluster from large to small and back to large again. The value for WIDTH is then passed to the Wimple module for use there. The Width module is the only processing module that is not designed to identify doubles conditions. To be conservative, WIDTH is zero when the line width goes from large to small, and becomes positive only if there is a succeeding change to large. Also, once WIDTH is positive, any slight decrease in the line width of the succeeding lines means that WIDTH immediately resets to zero.

For measuring the width change, it is assumed that the "line size" or width of the cluster at a line is the number of cells between and including the right edge position designated by RE and the left edge position LE. This is equivalent to the expression RE−LE+1.

The change in the line size from one line to the next is tracked by a variable called DWIDTH. DWIDTH represents the number of cells resulting from the subtraction of the size of the previous line from the size of the current line. This variable functions as DLE does in determining LDIMPSIZ in the Dimple module. DWIDTH is positive when the line size at the current line is greater than that of the previous line and negative when the line size appears to shrink. The formula for DWIDTH is derived as follows:

$$
\begin{aligned}
DWIDTH &= \text{line size of current line} - \text{line of previous line} \\
&= (RE - LE + 1) - (REL - LEL + 1) \\
&= RE - REL - LE + LEL
\end{aligned}
$$

Variables called WIDIN and WIDOUT function as DIMPIN and DIMPOUT do in the Dimple module. WIDIN represents the absolute value of the sum of negative or null DWIDTH values that occur on consecutive lines. WIDOUT represents the sum of positive or null DWIDTH values that occur on consecutive lines. WIDIN must be positive for WIDOUT to become nonzero at a line. The variable WIDTH represents the sum of the nonzero WIDIN and the nonzero WIDOUT at any given line. WIDTH reflects the size or extent of the object "necking", i.e., the line sizes in the cluster are progressing from large, to small, and back to large again.

Figure 17:
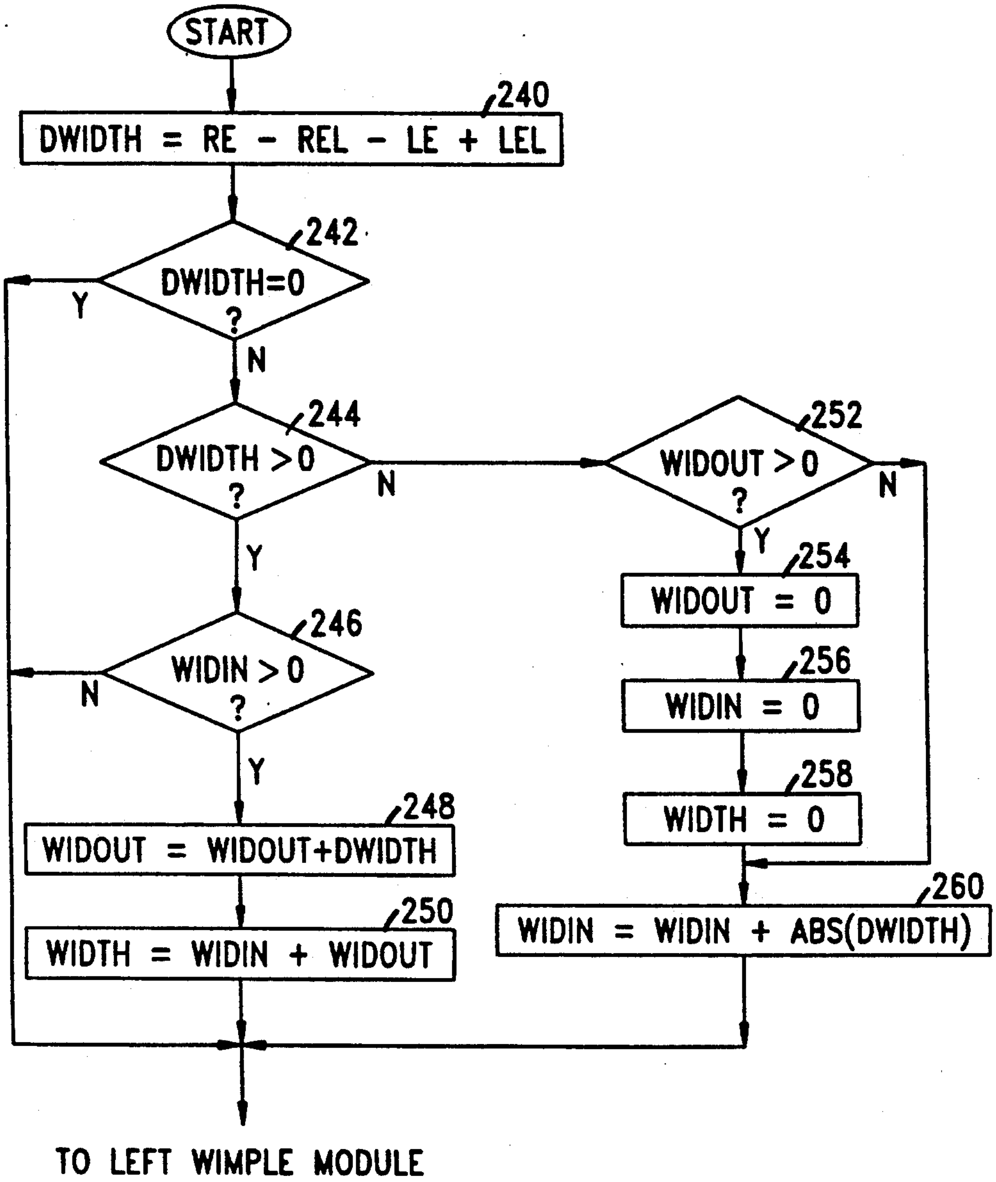
FIG. 17 illustrates a flow chart for implementing the Width routine.

Referring now to FIG. 17, there is illustrated a flow chart for implementing the width routine. The flow chart details a plurality of steps indicated by reference numerals 240 to 260 that are performed to pass information to the Wimple module. At the start of each cluster, the variables WIDIN, WIDOUT and WIDTH are zero.

Upon being invoked by the main program, the Width routine calculates DWIDTH in step 240. This variable is then tested in step 242 to determine if it is equal to zero. If it is zero, control is passed to the Wimple module. If DWIDTH is nonzero, another test is performed on DWIDTH in step 244 to determine if DWIDTH is positive. If DWIDTH is not positive, control passes to step 252 where WIDOUT is tested to determine if it is positive. If WIDOUT is positive, steps 254, 256 and 258 are executed to clear WIDOUT, WIDIN and WIDTH. WIDIN is then calculated pursuant to the formula set forth in step 260 and control is passed to the Wimple module. If WIDOUT is not positive, steps 254, 256 and 258 are skipped and control is passed to step 260 where WIDIN is calculated and control is passed back to the Wimple module.

If it is determined in step 244 that DWIDTH is positive, WIDIN is tested in step 246 to determine if it is positive. If WIDIN is not positive, control is passed to the Wimple module. If WIDIN is positive, WIDOUT is calculated in step 248, WIDTH is calculated in step 250 and then control is passed back to the Wimple module.

FIGS. 19A and 19B show two clusters which exhibit positive WIDTH characteristics. The values of the variables DWIDTH, WIDIN, WIDOUT and WIDTH are valid at the exit of the Width module for each line of the processing. Note that after doubles are identified in line seven of FIG. 19B, the variables WIDIN, WIDOUT and WIDTH are set to zero as required by the Width module reset in step 102 of the main program (see FIG. 7B).

Upon returning from the Width module, control is passed to the Left Wimple module as indicated in step 106 to analyze dimples which were judged to be inadequate indicators of doubles by the Dimple modules. The purpose of the Wimple module is to differentiate the dimples caused by noise from the ones that indicate doubles. Although it may appear that both types of dimples will be accompanied by some positive WIDTH, the dimples caused by noise generally have lower WIDTH values than those of the other type. Therefore, a threshold value is used to differentiate one type from the other.

Figure 18:
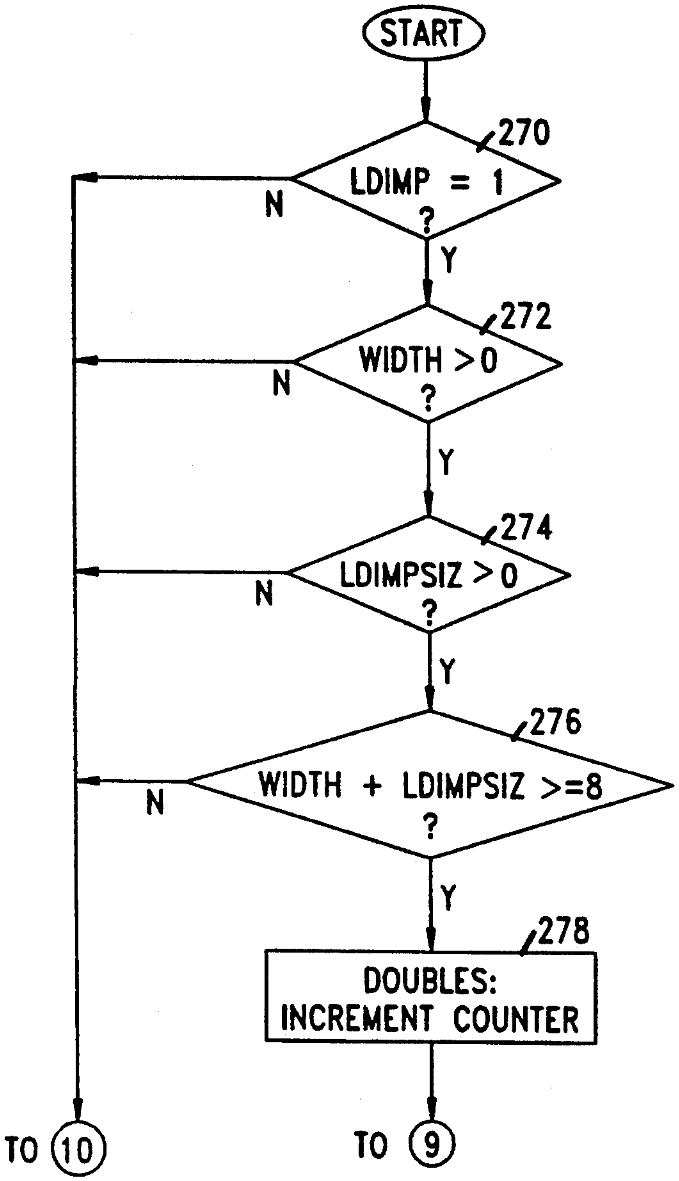
FIG. 18 illustrates a flow chart for implementing the Left Wimple module.

Referring now to FIG. 18, there is illustrated a flow chart for implementing the Left Wimple routine. The flow chart details a plurality of steps indicated by reference numerals 270 to 278 that are performed by the Wimple module to detect doubles. The numbers in circles indicate the return point in the main program as illustrated in FIGS. 7A–7B.

A threshold value for the sum WIDTH+LDIMPSIZ is chosen to separate the dimples due to noise from the ones that indicate doubles. A threshold value of eight is chosen in the exemplary embodiment of the present invention.

According to the flow chart, the Left Wimple module is enabled by the same flag, LDIMP, that enables the Left Dimple module. The reason that the same flag is used to enable/disable both modules is that both modules are based upon the same geometric feature of the cluster, i.e., the dimple. The Left Wimple module is technically an extension of the processing carried out by the Left Dimple module.

Upon being invoked by the main program, the Wimple module tests LDIMP to determine if it is equal to one in step 270. If it is not, control is passed to point ten of the main program (see FIG. 7B). If LDIMP is equal to one, WIDTH is tested in step 272 to determine if it is a positive value. If it is not, control is passed to point ten of the main program. If WIDTH is positive, LDIMPSIZ is tested in step 274 to determine if it is a positive value. If it is not, control is passed back to point ten of the main program. If LDIMPSIZ is a positive value, the sum of WIDTH and LDIMPSIZ is tested in step 276 to determine if it is greater than or equal to the threshold value for the sum. If it is not, control is passed back to point ten of the main program (see FIG. 7B). If the sum is greater than or equal to the threshold value, doubles have been detected. The counter will then be incremented by step 278 and then control is passed back to point nine of the main program (see FIG. 7B).

FIG. 19A illustrates an example of a dimple due to imaging noise in a single object. The variable and count values shown are valid at the exit of the Left Wimple module for each line of the processing. FIG. 19B shows a dimple of the same LDIMPSIZ as that of the dimple in FIG. 19A with the corresponding variable and count values for each scan. However, the dimple of FIG. 19B legitimately indicates two objects which are bunched together. Note that the WIDTH values corresponding to this dimple are substantially greater than those corresponding to the dimple due to noise. It is assumed that this holds true generally for all objects. Note also that the Width and Left Dimple modules are reset after the double is identified at line 7 so that WIDIN, WIDOUT, WIDTH, LDIMPIN, LDIMPOUT and LDIMPSIZ are set to zero. Since the Left Wimple module remains enabled, the foregoing variables are free to change in the following lines of the cluster if any more width changes or left dimples occur.

If control passes from the Left Dimple module to the main program via the path designated by the number nine, the enable flags of the Right Corner, Dimple and Wimple modules, RCORN and RDIMP, are set to zero in step 108, the enable flag for the Gap module, GAPMETH, is set to zero in step 100, all modules are reset in step 102, the variable CLUSTCOUNT is incremented in step 91, the STARTCLUST flag is set to zero in step 66 and control is then passed to step 64 where the foregoing loop is repeated.

If control passes from the Left Dimple module to the main program via the path designated by the number ten, control is passed to the Right Wimple module as indicated in step 110. This module is nearly identical to the Left Wimple module. The relevant differences between the modules are that the Left Wimple module utilizes the variable LDIMPSIZ and the LDIMP flag when identifying a wimple and the Right Wimple module utilizes the variable RDIMPSIZ and the RDIMP flag when identifying a wimple. The two modules function independently. Although the variable WIDTH is common to both, it is not altered in any way by either.

If control passes from the Right Wimple module to the main program via the path designated by the number nine, the enable flags for the Left Corner, Dimple and Wimple modules, LCORN and LDIMP, are set to zero in step 112, the enable flag for the Gap module, GAPMETH, is set to zero in step 100, all modules are reset in step 102, the variable CLUSTCOUNT is incremented in step 91, the STARTCLUST flag is set to zero in step 66 and control is then passed to step 64 where the foregoing loop is repeated.

If control passes back from the Right Wimple module to the main program via the path designated by the number 10, control is passed to the Left Corner module as indicated in step 114. The Corner modules identify movements in the left and right edges of a cluster that are characteristic of a double. The variables DLE and DRE used by the Dimple modules are used here as well. The feature that cues this module that a double is present is an "internal corner". An internal corner is a right angle in the contour of an image that comprises either a "top corner," which is a vertical edge of at least two cells followed by a horizontal "outward edge movement" of at least two cells, or a "bottom corner," which is a horizontal "inward edge movement" of at least two cells followed by a vertical edge of at least two cells. FIG. 12 shows an image that illustrates these top and bottom corner configurations.

The principle behind the Corner modules is that it is physically impossible for an image of one object to exhibit an internal corner if the object has a "normal" contour. As described above, "normal" means that the object is everywhere convex, e.g., it is not in any way saddle or "bow-tie" shaped.

The Left and Right Corner modules each check for the presence of the two types of internal corners described above. The first check is for a top corner. If this check does not yield doubles, each module then checks for a bottom corner.

For the detection of top corners, the Left Corner module compares the left edge position of one line with the left edge position of the preceding line. If the positions are the same, a "vertical edge movement" on the left side exists at the two lines.

A flag "LVERT" is used to indicate such a vertical movement at two or more lines. If an outward horizontal edge movement of more than one cell occurs directly following the detection of a vertical left edge movement, the corner formed indicates doubles. A horizontal edge movement is detected by checking the value and sign of DLE which was computed originally by the Left Dimple module. A positive DLE value greater than one corresponds to the number of cells in the horizontal leg of the top corner.

To detect bottom corners, the Left Corner module checks for a negative DLE value which indicates an inward edge movement. A flag "LHORIZ" is utilized to record the existence of an inward horizontal edge movement greater than one cell. A bottom corner and legitimate doubles are detected if a vertical edge condition at two or more lines is detected directly following this horizontal movement.

Figure 20:
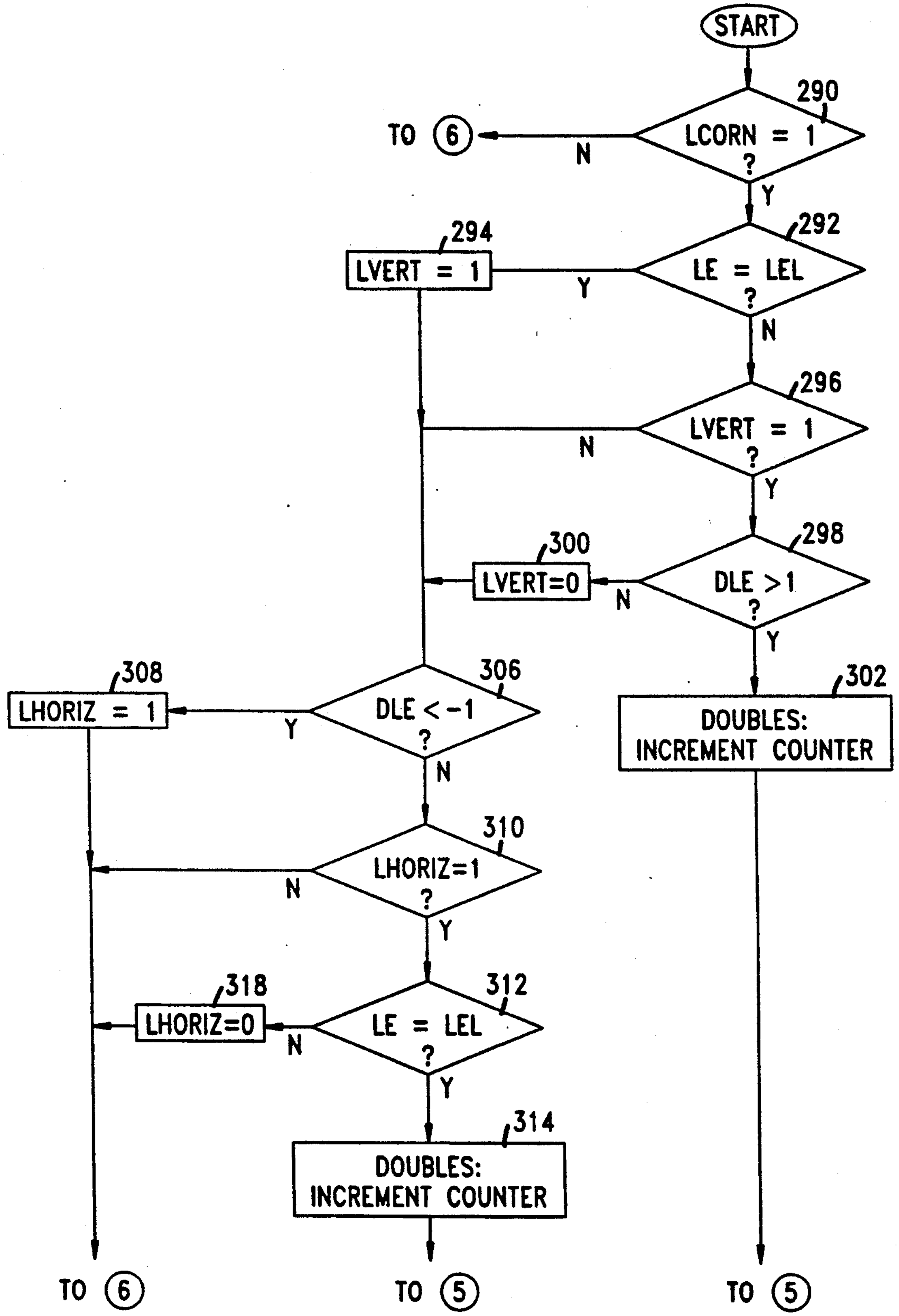
FIG. 20 illustrates a flow chart for implementing the Left Corner module.

Referring now to FIG. 20, there is illustrated flow chart for implementing the Left Corner module. The flow chart details a plurality of steps indicated by reference numerals 290 to 318 that are performed by the Left Corner module to detect doubles.

Upon being invoked from the main program, the module first checks for a top corner condition. LCORN is tested in step 290 to determine if the Left Corner module is enabled, i.e., LCORN is equal to one. If it is not, control is passed back to point six of the main program (see FIG. 7B). If LCORN is equal to one, control is passed to step 292 where LE is tested to determine if it is equal to LEL. If it is, a vertical edge of at least two cells exists and the LVERT flag is set in step 294. Since a vertical edge does not alone comprise a top corner, control passes to step 306 to begin the check for a bottom corner.

If LE is not equal to LEL in step 292, the LVERT flag is tested in step 296 to determine if it is set. Note that at this step LVERT indicates a vertical edge at some lines which precede the current line. If LVERT is clear, no top corner can exist and control is passed to step 306 to begin the check for a bottom corner condition. If the LVERT flag is set, DLE is tested in step 298 to determine if it is greater than one. If DLE is not greater than one, no outward edge movement required for a top corner configuration exists. The LVERT flag is cleared in step 300 and control is passed to step 306 to check for a bottom corner condition.

If DLE is greater than one in step 298, a legitimate top corner exists and doubles are detected. The counter is incremented in step 302 and control is passed back to point five of the main program (see FIG. 7B).

When control is passed to step 306 to check for a bottom corner condition, DLE is tested to determine if it is less than negative one. If it is, then an inward horizontal movement of two cells or more exists and the LHORIZ flag is set in step 308. Control is then passed to point six of the main program (see FIG. 7B). If DLE is not less than negative one, the LHORIZ flag is tested in step 310 to determine if it is set If it is not, control is passed back to point six of the main program (see FIG. 7B). If the LHORIZ flag is determined in step 310 to be set, this indicates an inward horizontal edge movement somewhere before the current line. LE is then tested in step 312 to determine if it is equal to LEL. If it is, there is a vertical edge movement which completes the configuration of a bottom corner. Doubles are detected and the counter is incremented in step 314. Control is passed back to point five of the main program (see FIG. 7B).

If LE is not equal to LEL, doubles are not detected, the LHORIZ flag is cleared in step 318 and control is passed back to point six of the main program (see FIG. 7B).

If control passes back from the Left Corner module to the main program via the path designated by the number five, the enable flags for the Right Corner, Dimple and Wimple modules, RCORN and RDIMP are set to zero in step 116, the enable flag for the Gap module, GAPMETH, is set to zero in step 118, all modules are reset in step 120, the variable CLUSTCOUNT is incremented in step 91, the STARTCLUST flag is set to zero in step 66 and control is then passed to step 64 where the foregoing loop is repeated.

If control passes from the Left Corner module to the main program via the path designated by the number six, control is passed to the Right Corner module as indicated in step 122. This module is nearly identical to the Left Corner module. The main difference between the two modules is that the left Corner module utilizes the variables LCORN, DLE, LVERT and LHORIZ, whereas the right Corner module utilizes the variables RCORN, DRE, RVERT and RHORIZ. The two modules operate independently of each other.

If control passes back from the Right Corner module to the main program via the path designated by the number five, the enable flags for the Left Corner, Dimple and Wimple modules, LCORN and LDIMP are set to zero in step 124, the enable flag for the Gap module, GAPMETH, is set to zero in step 118, all modules are reset in step 120, the variable CLUSTCOUNT is incremented in step 91, the STARTCLUST flag is set to zero in step 66 and control is then passed to step 54 where the foregoing loop is repeated.

If control passes back from the Right Corner module to the main program via the path designated by the number six, the STARTCLUST flag is set to zero in step 66 and control is then passed to step 64 where the foregoing loop is repeated.

After steps 64 and 68 are executed which move to the next line and set LEL equal to LE and REL equal to RE, the next line is read and the variables LE and RE are read in step 54. The line from the sensor array is examined in step 56 to determine if it is clear, i.e., no cells are blocked. At this point, when the line is clear, control passes to step 58 where the STARTCLUST flag is tested to determine if it is equal to zero. A clear line after STARTCLUST has been set to zero indicates the end of a cluster. When STARTCLUST is set to zero in step 66 and the current line is clear, control passes to step 60, the Area module.

The Area module reviews clusters which lack the prominent geometric features recognized by the other processing modules. It identifies doubles based on the size of a cluster alone; doubles result if its area is exceedingly large relative to that of a single object. The method is statistical as it must sample a number of cluster areas at the start of each counting. A threshold or cutoff value for the area is determined from this data. Any area larger than this cutoff will then indicate doubles.

The Area module calculates this threshold by finding the largest single object among the first thirty-two objects examined. This procedure assumes that, among these first thirty-two, an object will be found with an area that is close to the largest theoretical area a single object may possess. By multiplying this area by a "safety factor," the resulting cutoff area is ensured to represent a cluster of two objects. A value of 1.25 is a conservative value for the safety factor in the exemplary embodiment of the present invention.

During the sampling of the first thirty-two clusters, when the threshold value is calculated, the Area module accepts only those clusters which are counted as singles by the Gap, Edge Shift, Dimple, Wimple and Corner modules. It is assumed that these clusters truly represent singles, however, (as there is a need for the Area module) one of them may represent two objects.

To ensure that only single objects are processed, a preliminary cutoff is implemented to discard any "single" object in the first thirty-two that is much greater than the average "single" object. This preliminary cutoff is LGCUTOFF.

Figure 21:
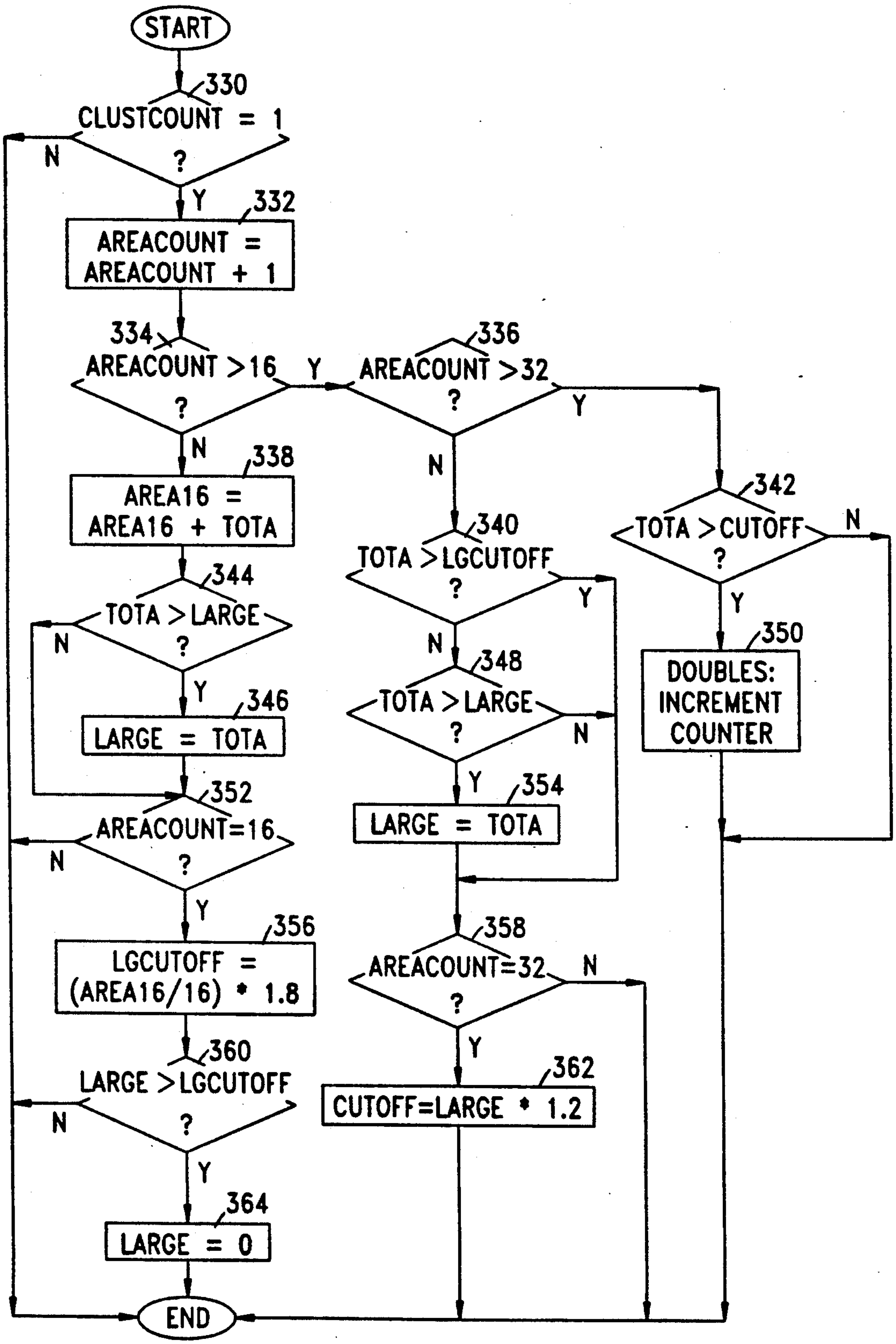
FIG. 21 illustrates a flow chart for implementing the Area module.

Referring now to FIG. 21, there is illustrated a flow chart for implementing the Area module. The flow chart details a plurality of steps indicated by reference numerals 330 to 364 that are performed by the Area module to detect doubles. The module tests only those clusters which, thus far, have been counted as one object.

The variables utilized by the Area module are CLUSTCOUNT, "AREACOUNT", "TOTA", "LARGE", "AREA16", "LGCUTOFF" and "CUTOFF". The variable AREACOUNT tallies the number of single object clusters that are processed by the Area module. The variable TOTA indicates the area of the cluster and is computed by the Edge Shift module (see explanation below). The variable LARGE represents the largest legitimate single object among the first thirty-two as judged by the preliminary cutoff value, LGCUTOFF. The variable AREA16 is the sum of the first sixteen clusters that pass through the Area module. The variable LGCUTOFF represents a pre-cutoff value defined to be the average of the first sixteen areas multiplied by 1.8. The variable CUTOFF is the final threshold value used by the Area module to differentiate singles from doubles of the incoming clusters. At an AREACOUNT of 32, it is computed to be the current LARGE value multiplied by 1.25.

Upon the start of the main program execution at step 52 (see FIG. 7B) the variables LARGE, AREA16 and AREACOUNT are set to zero. Thus, when the Area module considers its first cluster, LARGE is zero.

The Area module is divided into three stages. The first two stages compute the cutoff values and the last stage tests the incoming cluster areas against the cutoff. The first stage considers the first sixteen clusters counted by AREACOUNT. The second stage considers clusters seventeen to thirty-two. The third stage considers all clusters that follow until the required count is attained.

Upon entering the module, a check is made to determine if the variable CLUSTCOUNT is equal to one in step 330. It is always set to one at the beginning of each cluster and will be incremented each time any processing module other than the Area module detects doubles. If CLUSTCOUNT is not equal to one, control passes back to the main program. If CLUSTCOUNT is equal to one, the variable AREACOUNT is incremented in step 332. AREACOUNT is used to tally the thirty-two clusters required for the calculation of the cutoff value.

The largest single object is searched for among the first thirty-two clusters tallied by AREACOUNT. The greatest area is stored in the variable LARGE. The area of the cluster, TOTA, is computed previously by the Edge Shift module. The expression "TOTA>LARGE?" in step 344 is always true when AREACOUNT is equal to one because LARGE is only zero. As a result, LARGE is set equal to the value of TOTA, the area of the first cluster, in step 346. Thereafter, each incoming TOTA before AREACOUNT reaches 17 is compared with LARGE in step 344. If TOTA is greater than LARGE, LARGE takes on the value of TOTA.

To ensure that the largest single object is truly a single object and not a double, LGCUTOFF is computed when AREACOUNT is equal to sixteen in step 356. The variable AREA16 is used to compute the average utilized in calculating LGCUTOFF and is the sum of the first sixteen clusters processed by the Area module as calculated in step 338.

When AREACOUNT reaches sixteen, as tested in step 352, LARGE is compared with LGCUTOFF in step 360. If LARGE is greater than the preliminary threshold value, LARGE is set to zero in step 364. A new value for LARGE is then sought between the seventeenth and thirty-second cluster tallied by AREACOUNT. Refer to the middle column of the flow chart in FIG. 21. This new value must be less than LGCUTOFF as tested in step 340. Once the new LARGE is found, each incoming TOTA value thereafter is compared with LGCUTOFF in step 340 and LARGE in step 348. If TOTA is greater than LARGE and less than LGCUTOFF, it becomes the new LARGE in step 354.

Once AREACOUNT reaches thirty-two as tested in step 358, the current LARGE is multiplied by the safety factor 1.25 to determine the double indicating threshold CUTOFF in step 362. All cluster areas passing through the Area module thereafter will be tested against this value. If the cluster area TOTA is greater than CUTOFF as determined in step 342, then doubles are indicated, the count is incremented by one in step 350, and control passes to the main program.

Upon returning to the main program, steps 62, 64 and 68 are executed to move to the next line of the sensor array, and the variables LEL and REL are updated. Control is then passed to step 54 where the foregoing loop is repeated.

Figure 22A:
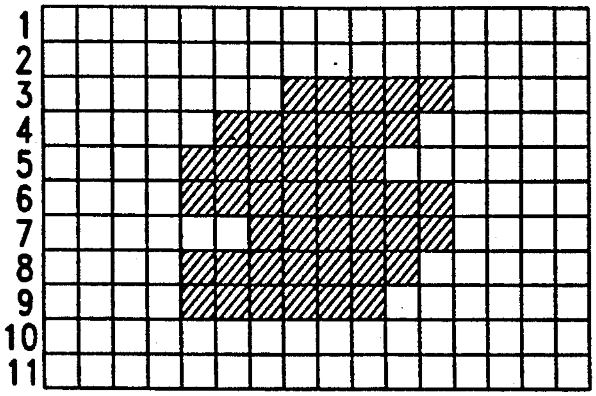
FIGS. 22A-22C show graphical representations of images to illustrate objects which are counted correctly due to the fact that some modules remain operative after an initial identification of doubles.
Figure 22B:
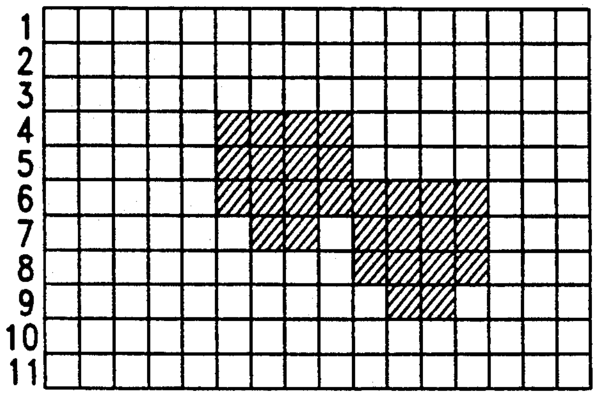
Figure 22C:
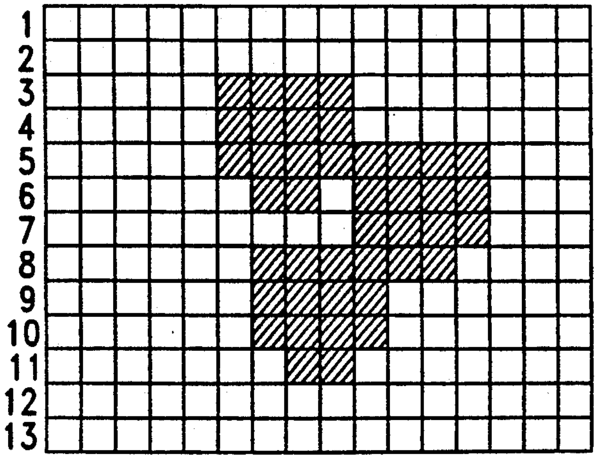

For a justification of the need to reset and disable certain modules, refer to FIGS. 22A–C. FIG. 22A illustrates a cluster of two objects with two dimple characteristics. At line six, the Right Dimple module recognizes the right dimple to be a doubles condition. The count is incremented, and in step 98 (see FIG. 7B), the Left Dimple module is disabled with the expression "LDIMP=0." Because it is disabled, it does not process the left dimple in lines six, seven and eight. Had it been enabled, it would have identified doubles redundantly at line eight.

If FIG. 22A had a bottom corner condition in lines six, seven, and eight instead of the dimple characteristic shown, then the cluster would still represent two objects. Since the corner could be recognized as a doubles condition by the Left Corner module, there is a similar need to disable the Left Corner module at line six. Thus, both the Left Dimple and the Left Corner modules are disabled in step 98 of the main program to prevent redundant counting.

FIG. 22B shows a cluster of two objects that contain an internal corner and a gap condition. Each isolated characteristic comprises a legitimate condition for doubles. The Right Corner module identifies doubles at line six. In step 118 (see FIG. 7B), the main program disables the Gap module with the expression "GAPMETH=0." Thus, at the following line eight, where the Gap module would have normally identified doubles, no additional counting results.

FIG. 22C illustrates a cluster of three objects which are counted correctly due to the fact that some modules remain operative after an initial identification of doubles. At line five, doubles are identified by the Right Corner module. The count for the cluster is incremented to two. Also at line five, the Gap module is disabled in step 118 of the main program (see FIG. 7B). Because it is disabled, the gap condition in line six does not indicate doubles. However, the Right Corner module remains operative so that it identifies the bottom corner condition in lines eight, nine and ten to be legitimate doubles. The count is incremented once again at line ten so that the final count for the cluster is three. In this fashion, the program has the capacity to identify four, five, or more objects in a cluster.

The foregoing description identifies the interaction of the various software modules and describes how each is integrated into the program hierarchy.

GLOSSARY OF TERMS

AREA16: A variable used by the Area module which is the tallied sum of the TOTA values belonging to the first sixteen clusters analyzed by that module. It is used in the computation for the preliminary cutoff LGCUTOFF.

AREACOUNT: A variable which is the number of clusters counted as single objects by the Gap, Edge Shift, Dimple, Wimple and Corner modules. It is used by the Area module to tally the number of clusters it analyzes.

bottom corner: An "internal corner" of type (1) (see def.).

cell: A single sensor location in the array of sixteen.

CELLS: The number of consecutive blocked cells in an ungapped line. If the line is gapped, then "cells" is the number of consecutive blocked cells to the left of the first gap in the line.

clear line: A line containing no blocked cells.

cluster: A configuration of blocked cells that represents one or more objects. Each line of the cluster contains at least one blocked cell, and the lines which directly precede and follow it are clear.

CLUSTCOUNT: A variable which is the number of objects counted in the current or most recently scanned cluster.

corner: See definition for "internal corner".

current line: A line that has most recently been scanned.

CUTOFF: The final threshold value used by the Area module to differentiate singles from doubles of the incoming clusters. At an AREACOUNT of 32, it is computed to be the current value of LARGE multiplied by 1.25.

dimple: On one side of the image, a geometric feature that is comprised of one or more "inward edge movements" followed by one or more "outward edge movements". Refer to defs. of terms in quotations.

DLE: The change in position of the "left edge" between the current line and its preceding line: DRE=-LEL−LE.

DRE: The change in position of the "right edge" between the current line and its preceding line: DRE=-RE−REL.

doubles: In a given cluster of two or more objects, the condition of "doubles" occurs when any one of the objects except for the first or topmost one is identified.

DWIDTH: The number of cells resulting from the subtraction of the previous line's "line size" from the current line's "line size".

edge shift: A "space shift" or a "regular edge shift".

enable flag: A flag which, when set to zero, serves to prevent its corresponding module from incrementing the count even when conditions for doubles exist for that module. The flags of this type include LDIMP, RDIMP, LCORN, RCORN and GAPMETH, corresponding respectively to the Left Dimple, Right Dimple, Left Corner, Right Corner, and Gap modules. The flags LDIMP and RDIMP are the enable flags for the Left and Right Wimple modules, respectively.

enabled module: Any module with a positive enable flag, as well as the Area module and the Edge Shift module, which are permanently enabled. These modules have the ability to increment the count if their respective conditions for doubles should arise.

ESENTA: The number of cells counted by the variable CELLS that precede an edge shift and follow a significant edge shift or a clear line.

ESFLAG: A flag which, when positive, indicates the presence of an edge shift at the current line or at a line that was scanned previously, in the same cluster.

gap: The condition in a line where there is at least one clear cell between two blocked cells.

GAPMETH: A flag that, when set positive, enables the Gap module to increment the count, should the conditions for doubles by this method exist.

insignificant edge shift: A regular edge shift which does not represent the division between two objects. It is part of the image of a single object which may be very small or very thin.

internal counter: A right angle in the contour of an image that is formed by either (1) a horizontal "inward edge movement" that is a minimum of two cells followed by a "vertical edge" that is at least two cells, or (2) the same vertical edge followed by a horizontal "outward edge movement" that is at least two cells.

inward edge movement: The condition between two lines where DLE or DRE is movement negative at the second line. Generally, the contour moves towards the center of the image.

LARGE: A variable used by the Area module that is the greatest TOTA (area value) of the first 32 clusters analyzed by that module, with the condition that it must be less than the preliminary cutoff value LGCUTOFF.

LCORN: A flag that, when set positive, enables the Left Corner module to check for doubles at the current line.

LDIMP: A flag that, if set positive, enables the Left Dimple module and the Left Wimple module to check for doubles at the current line.

LDIMPIN: A positive number that is the number of cell lengths that the contour of the left side travels in the inward direction. It indicates the size of the "inward edge movement" of a left dimple.

LDIMPSIZ: Used by the Left Wimple module, it is a variable which is a measure of the size of the dimple on the left side. It is equal to the sum of LDIMPIN and LDIMPOUT.

LDIMPOUT: A positive number that is the number of cell lengths the left contour travels in the outward direction. It represents the size of the "outward edge movement" of a dimple.

LE, left edge: The position (0−15) of the first blocked cell from the left in the current line.

LEADGAP: A flag used by the Gap Module to indicate the presence of a gap on the leading edge of a cluster.

leading edge: The first or top line of a cluster.

LEL: The left edge position (LE) of the line directly preceding the current line.

LGCUTOFF: The preliminary cutoff value of the Area module that is the average TOTA value of the first 16 clusters analyzed by that module, multiplied by 1.8. It serves to reject the very large cluster areas which might be doubles so that, at the thirty-second cluster, the final cutoff value cutoff may be more accurately determined.

LHORIZ: A flag used by the Left Corner module that sets positive upon the determination of a negative DLE which is of absolute value two or greater.

line: One complete scan of the sixteen cells in the sensor array. It is scanned from left to right.

line size: The width of a cluster at a line, equal to the right edge position (RE) minus the left edge position (LE) plus one.

LVERT: A flag which is set positive at the condition of identical left edge positions (LE values) that occur on two consecutive lines.

MAXESENTA: A constant that is the maximum number of cells a single object may have with one or more insignificant edge shifts as part of its image. In the exemplary embodiment of the invention, this constant is 5.

noise gap: A gap that is positioned either on the leading or trailing edge of a cluster, with a line adjacent to it that is part of the image and contains no gaps. The program assumes that all gaps of this type are due to noise and do not indicate doubles.

outward edge movement: The condition between two lines where DLE or DRE is positive at the second line. Generally, the contour moves away from the center of the image.

PREA: The total number of cells which precede the current line and follow (1) the start of a cluster, (2) a significant edge shift, or (3) a resetting of the edge shift variables if there are doubles by some other module. In the first case, this number includes the cells in the first line of the cluster.

PREGAP: A flag used by the Gap Module to indicate the presence of a gap on any line except the leading edge of the cluster.

RCORN: A flag that, when set positive, enables the Right Corner module to check for and identify doubles at the current line.

RDIMP: A flag that, when set positive, enables the Right Dimple module and the Right Wimple module to check for and identify doubles at the current line.

RDIMPIN: A positive number that is the number of cell lengths that the contour of the right side travels in the inward direction. It potentially indicates the size of the inward edge movement of a right dimple.

RDIMPSIZ: A measure of the size of a dimple on the right side. It is equal to the sum of RDIMPIN and RDIMPOUT.

RDIMPOUT: A positive number that is the number of cell lengths the contour on the right side travels in the outward direction. It represents the size of the "outward edge movement" of a dimple.

RE, right edge: The position (0–15) of the first blocked cell from the right in the current line.

regular shift: The condition between two consecutive edge lines where one blocked cell of the first is contiguous with one of the second at exactly one point. The remainder of the blocked cells on each line are not contiguous with those of the other.

REL: The right edge position (RE) of the line directly preceding the current line.

reset (of a module): The condition when the variables of a module acquire "clean slate" values which contain no information about the cluster geometry. Such resetting typically occurs at the first line of a cluster and at lines where doubles are detected.

RHORIZ: A flag used by the Right Corner module that sets positive upon the determination of a negative DRE which is of absolute value 2 or more.

RVERT: A flag which is set positive at the condition of identical right edge positions (RE values) at two consecutive lines.

shift: See "edge shift".

significant edge shift: A "regular edge shift" that indicates a doubles condition, representing the division between two objects.

space shift: The condition between two consecutive lines of a cluster where the blocked cells of the first are not touching those of the second at any point.

STARTCLUST: A flag that sets positive at a clear line. It is used to identify the first and last lines of a cluster.

TOTA: A variable used by the Edge Shift and Area modules which is the sum of PREA and CELLS. It is the tallied area of a cluster or a part of a cluster which follows a resetting of the Edge Shift module.

top corner: An "internal corner" of type (2) (see def).

trailing edge: The last or bottom line of a cluster.

vertical edge: A vertical portion of the contour which is two movement cells or greater in length. It occurs when two or more consecutive lines share the same DLE or DRE value.

WIDIN: A positive number which is the absolute value of the sum of negative DWIDTH values that occur over a series of lines. These lines must have only negative or zero DWIDTH values between them. It can be considered to be the amount of cells that the line size shrinks over this series of lines.

WIDTH: The sum of a positive WIDIN and a positive WIDOUT at a line. It indicates the extent of the change of the line size from large to small and back to large again.

WIDOUT: A positive number which is the absolute value of the sum of positive DWIDTH values that occur over a series of lines. These lines must have only positive or zero DWIDTH values between them. It can be considered to be the amount of cells that the line size expands over this series of lines.

wimple: A dimple that is comprised of an "inward" or "outward edge movement" that is only one cell in length, accompanied by a positive WIDTH value (see def.) A left wimple characteristic exists if LDIMPSIZ and WIDTH are each two or greater at any one line.

What is claimed is:

1. An apparatus for counting a plurality of differently shaped objects comprising:

a) an object supply receptacle;

b) an object feeding device coupled to the object supply receptacle and adapted to receive one or more batches of objects at a time, each batch of objects including objects shaped differently to objects in other batches, and to dispense each of the one or more batches of objects therefrom, the objects being dispensed in a random orientation relative to each other;

c) an electronic sensing device arranged adjacent to said object feeding device including a linear array of electronic detectors to detect the presence of differently shaped objects being dispensed from the object feeding device and passing thereby in a random orientation in each of a series of evenly timed signal reception periods, each one of the electronic detectors being in a blocked state when an object or objects are detected by the electronic detector in any one timed signal reception period and generating a signal representative of the blocked state; and d) an electronic counting device including a programmed microprocessor system, the electronic counting device coupled to said electronic sensing device to receive, during each of the series of evenly timed signal reception periods, the signals generated by said electronic sensing device, and to utilize the received signals from the multiple of signal reception periods to develop an image representative of the detected objects as they pass in a random orientation, said programmed microprocessor including a processing hierarchy comprising a main control program and a set of image processing modules to analyze the relative number and position of blocked detectors in each of a multiple of successive timed signal reception periods to determine the presence of more than one object, the image processing modules being called by the main control program upon the reception of a signal from at least one blocked detector in a preselected hierarchal order and each image processing module being adapted to detect a preselected geometric condition in the number and positions of detectors blocked by the randomly oriented objects in a multiple of successive timed signal reception periods, the set of image processing modules including:

a first image processing module adapted to detect a gap geometric condition in the number and positions of blocked detectors in a multiple of successive timed signals reception periods, a second image processing module adapted to detect a shift geometric condition in the number and positions of blocked detectors in a multiple of successive timed signal reception periods, a third image processing module adapted to detect a dimple geometric condition in the number and positions of blocked detectors in a multiple of successive timed signal reception periods, and a fourth image processing module adapted to detect a corner geometric condition in the number and positions of blocked detectors in a multiple of successive timed signal reception periods;

wherein said electronic counting device is further coupled to said object feeding device to control the operation thereof in response to indications of the image processing.

2. The apparatus of claim 1, wherein each one of the electronic detectors comprises a photoelectronic device.

3. The apparatus of claim 1, wherein the third module further comprises an image width determination module and a fifth image processing module to detect a wimple geometric condition in the number and positions of blocked detectors in a multiple of successive timed signal reception periods.

4. The apparatus of claim 1, wherein the first through fourth modules are linked to each other in a hierarchy according to the respective module numbers.

5. The apparatus of claim 4, wherein, upon the reception of a signal from at least one blocked detector, the main control program increments a count and calls the image processing modules, in hierarchal order, with control being returned to the main control program by any one of the image processing modules when the one image processing module detects a respective geometric condition that indicates the presence of more than one object, the one module that detects a respective geometric condition incrementing the count.

6. The apparatus of claim 4, wherein preselected ones of the image processing modules analyzes geometric conditions on each of a left side and a right side of an image developed from a multiple of successive timed signal reception periods.

7. The apparatus of claim 5, wherein preselected ones of the image processing modules are reset upon the incrementing of the count by other ones of the image processing modules.

8. The apparatus of claim 5, further comprising a sixth image processing module to monitor an area of the image and to increment the count when the area of the image is more than a preselected value.

9. An apparatus for counting objects comprising:

a) an object supply receptacle;

b) an object feeding device coupled to the object supply receptacle and adapted to receive and transport objects therefrom;

c) an electronic sensing device arranged adjacent to said object feeding device including a linear array of electronic detectors to detect the presence of an object or objects passing thereby in each of a series of evenly timed signal reception periods, each one of the electronic detectors being in a blocked state when an object or objects are detected by the electronic detector in any one timed signal reception period and generating a signal representative of the blocked state; and d) an electronic counting device including a programmed microprocessor system coupled to said electronic sensing device and said object feeding device, the electronic counting device including a processing hierarchy comprising a main control program and a set of image processing modules to analyze the relative number and position of the blocked detectors in each of a multiple of successive timed signal reception periods to develop an image representative of the detected objects, to perform image processing on the developed image to determine contour information of the image based upon signals received during the multiple of signal reception periods, to analyze the contour information for an indication of the presence of more than one object in the developed image and to control the operation of the object feeding device in response to indications of the image processing, the image processing modules being called by the main control program upon the reception of a signal from at least one blocked detector in a preselected hierarchal order, the set of image processing modules including:

a first image processing module adapted to detect a gap geometric condition in the number and positions of blocked detectors in a multiple of successive timed signal reception periods, a second image processing module adapted to detect a shift geometric condition in the number and positions of blocked detectors in a multiple of successive timed signal reception periods, and a third image processing module adapted to detect a dimple geometric condition in the number and positions of blocked detectors in a multiple of successive timed signal reception periods.

10. The apparatus of claim 9, wherein each one of the electronic detectors comprises a photoelectronic device.

11. The apparatus of claim 9, wherein the set of image processing modules further includes a fourth image processing module adapted to detect a corner geometric condition in the number and positions of blocked detectors in a multiple of successive timed signal reception periods.

12. The apparatus of claim 9, wherein the third module further comprises an image width determination module and a fifth image processing module to detect a wimple geometric condition in the number and positions of blocked detectors in a multiple of successive timed signal reception periods.

13. The apparatus of claim 11, wherein the first through fourth modules are linked to each other in hierarchy according to the respective module numbers.

14. The apparatus of claim 13, wherein, upon the reception of a signal from at least one blocked detector, the main control program increments a count and calls the image processing modules, in hierarchal order, with control being returned to the main control program by any one of the image processing modules when the one image processing module detects a respective geometric condition that indicates the presence of more than one object, the one module that detects a respective geometric condition incrementing the count.

15. The apparatus of claim 13, wherein preselected ones of the image processing modules analyzes geometric conditions of each of a left side and a right side of an image developed from a multiple of successive timed signal reception periods.

16. The apparatus of claim 14, wherein preselected ones of the image processing modules are reset upon the incrementing of the count by other ones of the image processing modules.

17. The apparatus of claim 14, further comprising a sixth image processing module to monitor an area of the image and to increment the count when the area of the image is more than a preselected value.

18. An apparatus for counting a plurality of differently shaped objects comprising:

a) an object feeding device adapted to receive and dispense a plurality of differently shaped objects;

b) an electronic sensing device arranged adjacent to said object feeding device including a linear array of electronic detectors to detect the presence of an object or objects being dispensed from the object feeding device in each of a series of timed signal reception periods, each one of the electronic detectors being in a blocked state when an object or objects are detected by the electronic detector in any one timed signal reception period and generating a signal representative of the blocked state; and c) an electronic counting device including a programmed microprocessor system having a processing hierarchy comprising a main control program and a set of image processing modules to analyze the relative number and position of blocked detectors in each of a multiple of successive timed signals reception periods to determine the presence of more than one object, the electronic counting device coupled to said electronic sensing device to receive, during one of the evenly timed signals reception periods, the signals generated by said electronic sensing device, and to utilize the received signals from the multiple of signal reception periods to develop an image representative of the detected objects, the image processing modules being called by the main control program upon the reception of a signal from at least one blocked detector in a preselected hierarchal order and each image processing module being adapted to detect a preselected geometric condition in the number and positions of blocked detectors in a multiple of successive timed signal reception periods, the set of image processing modules including:

a first image processing module adapted to detect a gap geometric condition in the number and positions of blocked detectors in a multiple of successive timed signals reception periods, a second image processing module adapted to detect a shift geometric condition in the number and positions of blocked detectors in a multiple of successive timed signal reception periods, a third image processing module adapted to detect a dimple geometric condition in the number and positions of blocked detectors in a multiple of successive timed signal reception periods, and a fourth image processing module adapted to detect a corner geometric condition in the number and positions of blocked detectors in a multiple of successive timed signal reception periods;

wherein said electronic counting device is further coupled to said object feeding device to control the operation thereof in response to indications of the image processing.

19. The apparatus of claim 18, wherein the third image processing module further comprises an image width determination module and a fifth image processing module to detect a wimple geometric condition in the number and positions of blocked detectors in a multiple of successive timed signal reception periods.

20. The apparatus of claim 19, further comprising a sixth image processing module to monitor an area of the image and to increment the count when the area of the image is more than a preselected value.

21. An apparatus for counting objects comprising:

a) an object feeding device to dispense objects in a random orientation therefrom;

b) an electronic sensing device arranged adjacent to said object feed device, the electronic sensing device including a linear array of electronic detectors to detect in each of a series of timed signal reception periods the presence of objects dispensed from said object feeding device and passing in a random orientation by said electronic sensing device, each one of the electronic detectors being in a blocked state when an object or objects are detected by the electronic detector in any one timed signal reception period and generating a signal representative of the blocked state; and c) an electronic counting device including a programmed microprocessor, the programmed microprocessor including a processing hierarchy comprising a main control program and a set of image processing modules to analyze the relative number and position of blocked detectors in each of the successive timed signal reception periods to determine the presence of more than one object, the electronic counting device coupled to said electronic sensing device to receive, during each of the timed signal reception periods, the signals generated by said electronic sensing device, to utilize the received signals from the multiple of signal reception periods to develop an image representative of the detected objects as they pass in a random orientation, the image processing modules being called by the main control program upon the reception of a signal from at least one blocked detector in a preselected hierarchal order, each image processing module being adapted to detect a preselected geometric condition in the number and positions of detectors blocked by the randomly orientated objects in a multiple of successive timed signal reception periods, the set of image processing modules including:

a first image processing module adapted to detect a gap geometric condition in the number and positions of detectors blocked by the randomly orientated objects in a multiple of successive timed signal reception periods, a second image processing module adapted to detect a shift geometric condition in the number and positions of detectors blocked by the randomly orientated objects in a multiple of successive timed signal reception periods, a third image processing module adapted to detect a dimple geometric condition in the number and positions of detectors blocked by the randomly orientated objects in a multiple of successive timed signal reception periods, and a fourth image processing module adapted to detect a corner geometric condition in the number and positions of detectors blocked by the randomly orientated objects in a multiple of successive timed signal reception periods.

22. The apparatus of claim 21, wherein said electronic counting device is further coupled to said object feeding device to control the operation thereof in response to indications of the image processing.

23. The apparatus of claim 21, wherein each one of the electronic detectors comprises a photoelectronic device.

24. The apparatus of claim 23, wherein the third image processing module further comprises an image width determination module and a fifth image processing module to detect a wimple geometric condition in the number and positions of detectors blocked by the randomly orientated objects in a multiple of successive timed signal reception periods.

25. The apparatus of claim 23, wherein the first through fourth modules are linked to each other in a hierarchy according to the respective module numbers.

26. The apparatus of claim 25 wherein, upon the reception of a signal from at least one blocked detector, the main control program increments a count and calls the image processing modules, in hierarchal order, with control being returned to the main control program by any one of the image processing modules when the one image processing module detects a respective geometric condition that indicates the presence of more than one object, the one module that detects a respective geometric condition incrementing the count.

27. The apparatus of claim 25, wherein preselected ones of the image processing modules analyzes geometric conditions of each of a left side and a right side of an image developed from a multiple of successive timed signal reception periods.

28. The apparatus of claim 26, wherein preselected ones of the image processing modules are reset upon the incrementing of the count by other ones of the image processing modules.

29. The apparatus of claim 26, further comprising a sixth image processing module to monitor an area of the image and to increment the count when the area of the image is more than a preselected value.

30. The apparatus of claim 24, further comprising a sixth image processing module to monitor an area of the image and to increment the count when the area of the image is more than a preselected value.

* * * * *